United States Patent [19]
Clarke et al.

[11] 3,731,433
[45] May 8, 1973

[54] APPARATUS FOR GRINDING TOOTHED FACED MEMBERS

[75] Inventors: James F. Clarke; Thomas A. Deprez, both of Rochester, N.Y.

[73] Assignee: The Gleason Works, Rochester, N.Y.

[22] Filed: Nov. 17, 1970

[21] Appl. No.: 90,440

Related U.S. Application Data

[62] Division of Ser. No. 803,683, March 3, 1969, Pat. No. 3,640,030.

[52] U.S. Cl. .................................... 51/34 K, 51/131
[51] Int. Cl. ............................................. B24b 19/00
[58] Field of Search .................... 51/131, 34 K, 129

[56] References Cited

UNITED STATES PATENTS

| | | | |
|---|---|---|---|
| 2,629,209 | 2/1953 | Miller | 51/131 |
| 1,904,608 | 4/1933 | Bettini | 51/34 K |
| 2,200,573 | 5/1940 | Connor | 51/34 K |
| 3,305,978 | 2/1967 | Lumsden | 51/131 X |
| 2,063,492 | 12/1936 | Peleenor | 51/287 X |
| 2,401,446 | 6/1948 | Wildhaber | 51/287 |
| 2,979,869 | 4/1961 | Birleson | 51/327 UX |

*Primary Examiner*—Harold D. Whitehead
*Attorney*—Cushman, Darby & Cushman

[57] ABSTRACT

The present invention includes provision of the use of an adaptive gauging process in connection with tooth slot forming operations wherein a gauge probe from a control system is inserted into a tooth slot that is already cut, and any deviations from the proper tooth size, as indicated by the reading taken by the probe, will be taken into account in connection with cutting the next tooth slot. Thus, the feeding movements between the tool and workpiece will be modified through the control system under the control of the gauging probe after the latter takes a reading of the size of the previously cut tooth slot. Also, a precision, intermittently operating work indexing mechanism utilizing a control system is provided for operating in conjunction with the gauging probe to further improve the precision of the finished product.

The present invention further comprises an orientation of machine parts wherein the work table is arranged to mount a workpiece for rotary movement about a vertical axis, and the grinding wheel is adjustably carried above the workpiece, and for rotation about a vertical axis.

13 Claims, 34 Drawing Figures

Patented May 8, 1973
3,731,433
22 Sheets-Sheet 5
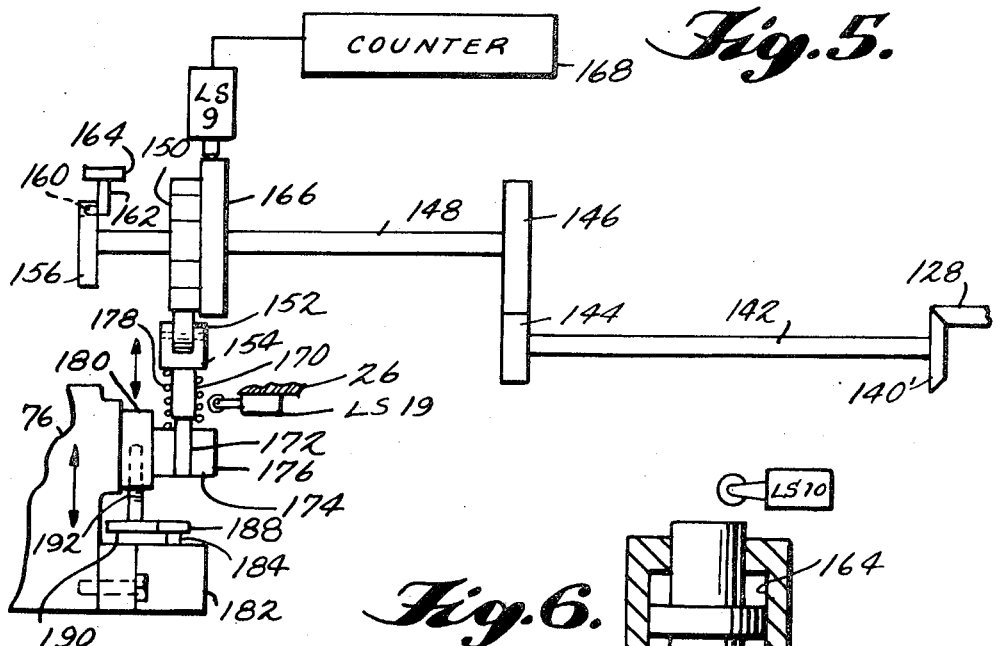
*Fig. 5.*
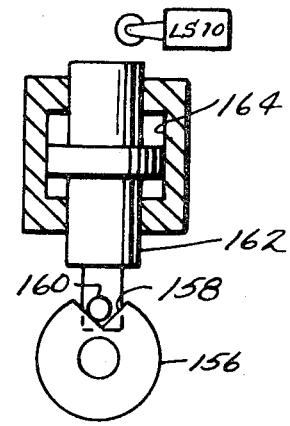
*Fig. 6.*
*Fig. 24.*
- ▽5  BLOCK NO 5 ON TAPE
- ▢4  LIMIT SWITCH NO. 4.
- ⬡D6  DE-ENERGIZE SOL. NO. 6.
- ⬡E5  ENERGIZE SOL. NO. 5.
- ◯T3  TIMER NO. 3.
- ⬡FEED .175/.010  CONTROLLED FEED RATE FOR GRIND TO .175" DEPTH PLUS .010" INDEX CLEARANCE
- ◯INDEX  RUN INDEX MOTOR (MOTOR SPEED SET BY SELECTOR SWITCH)
- ▭A  ALPHA (TAPE) CONTROL
- ⬡B  BETA LOGIC CONTROL
- ⬭K  KAPPA CONTROLLER
- ⬭G  GAMMA SERVO-CONTROLLER

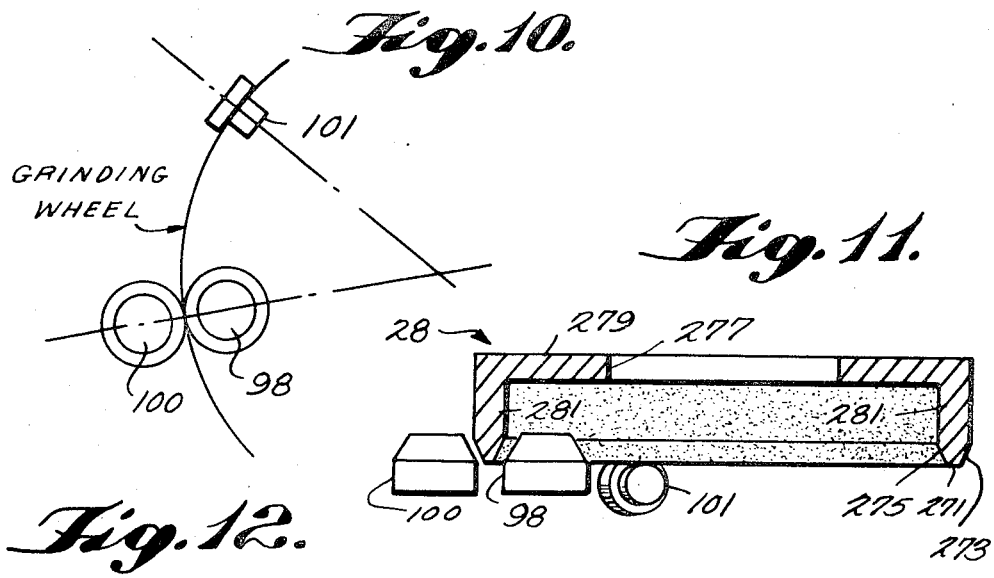
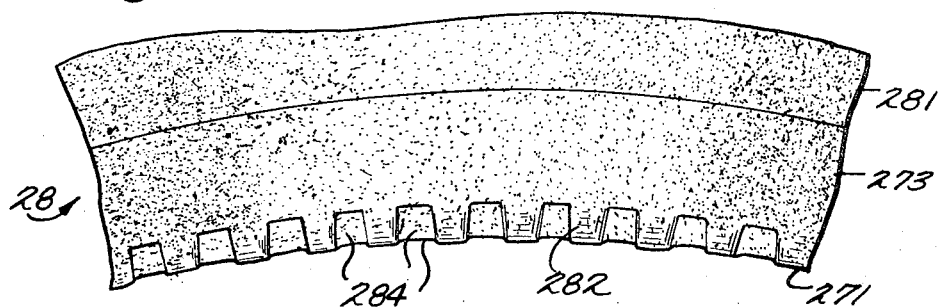
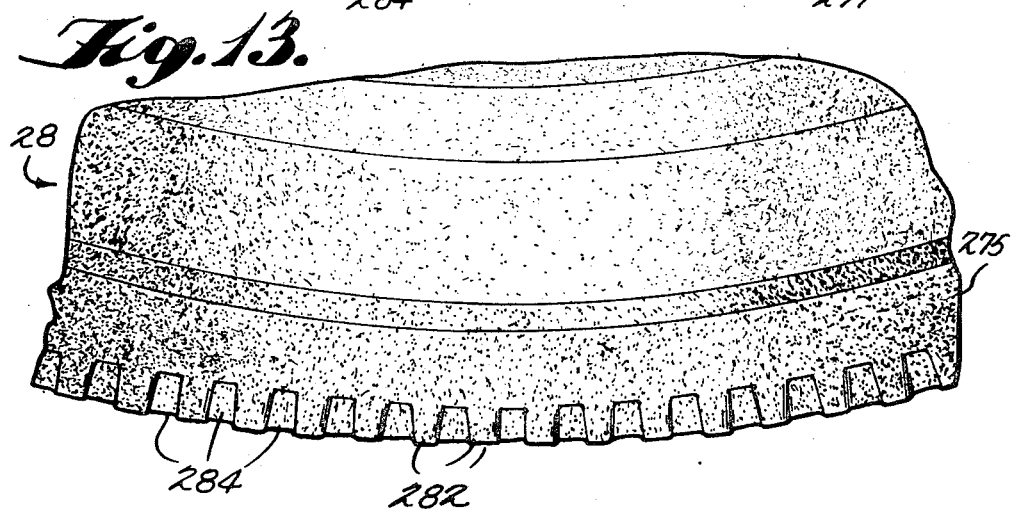

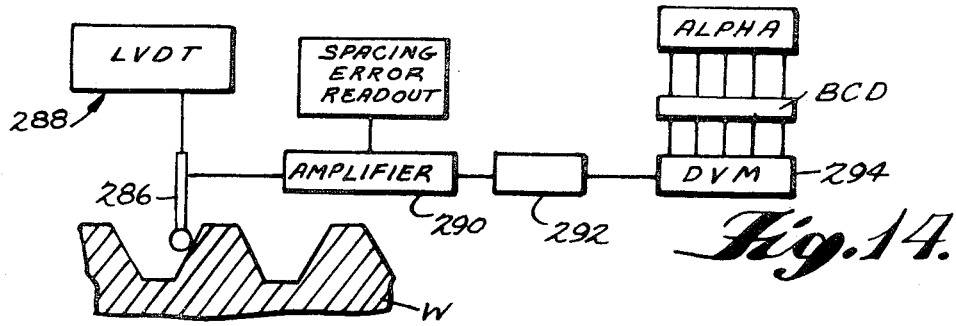
Fig. 14.
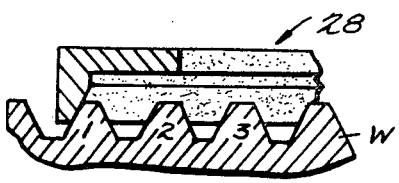
Fig. 15.
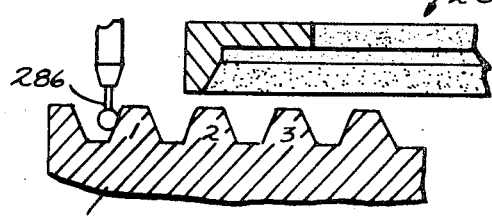
Fig. 16.
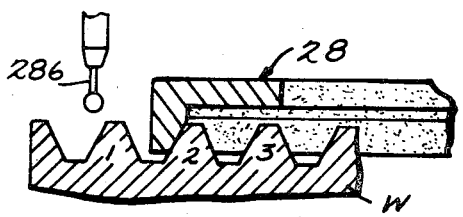
Fig. 17.
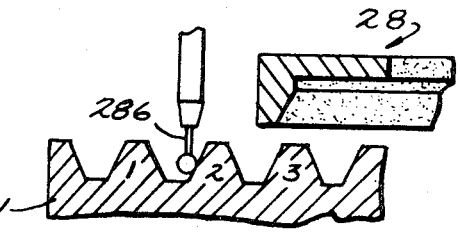
Fig. 18.
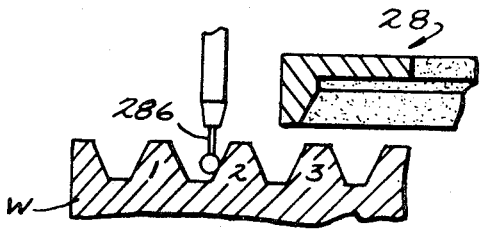
Fig. 19.
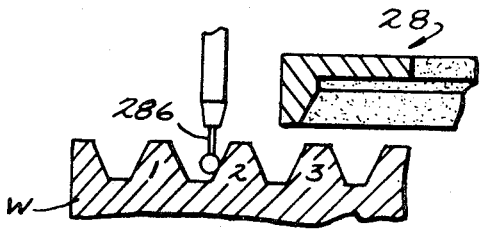
Fig. 20.
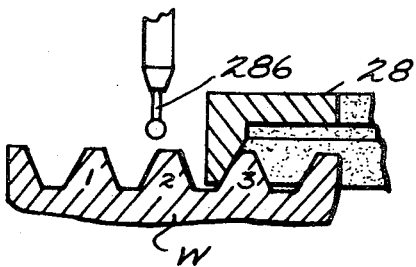
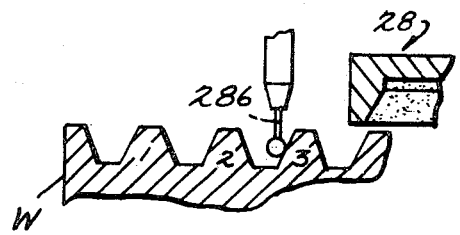

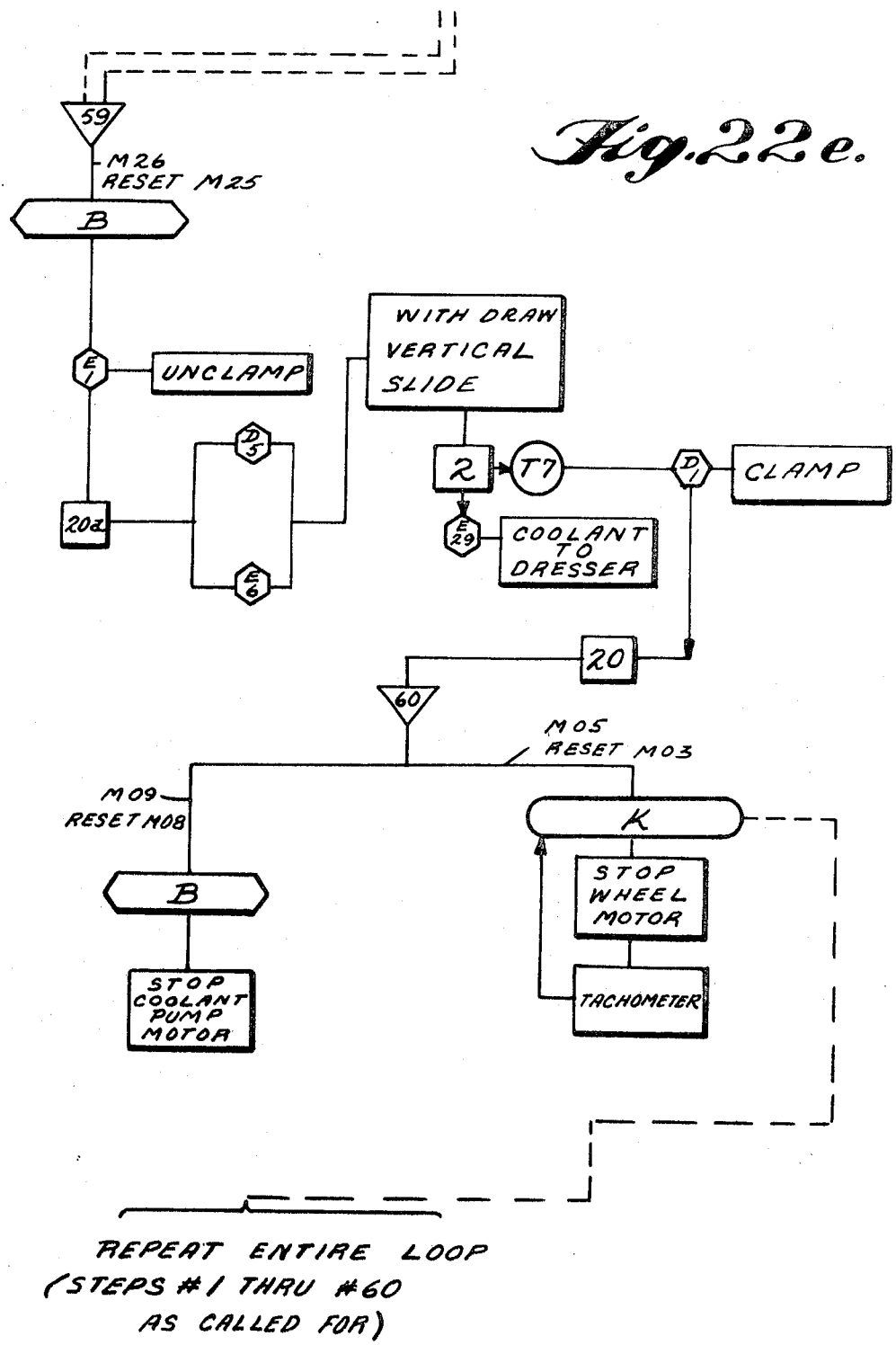

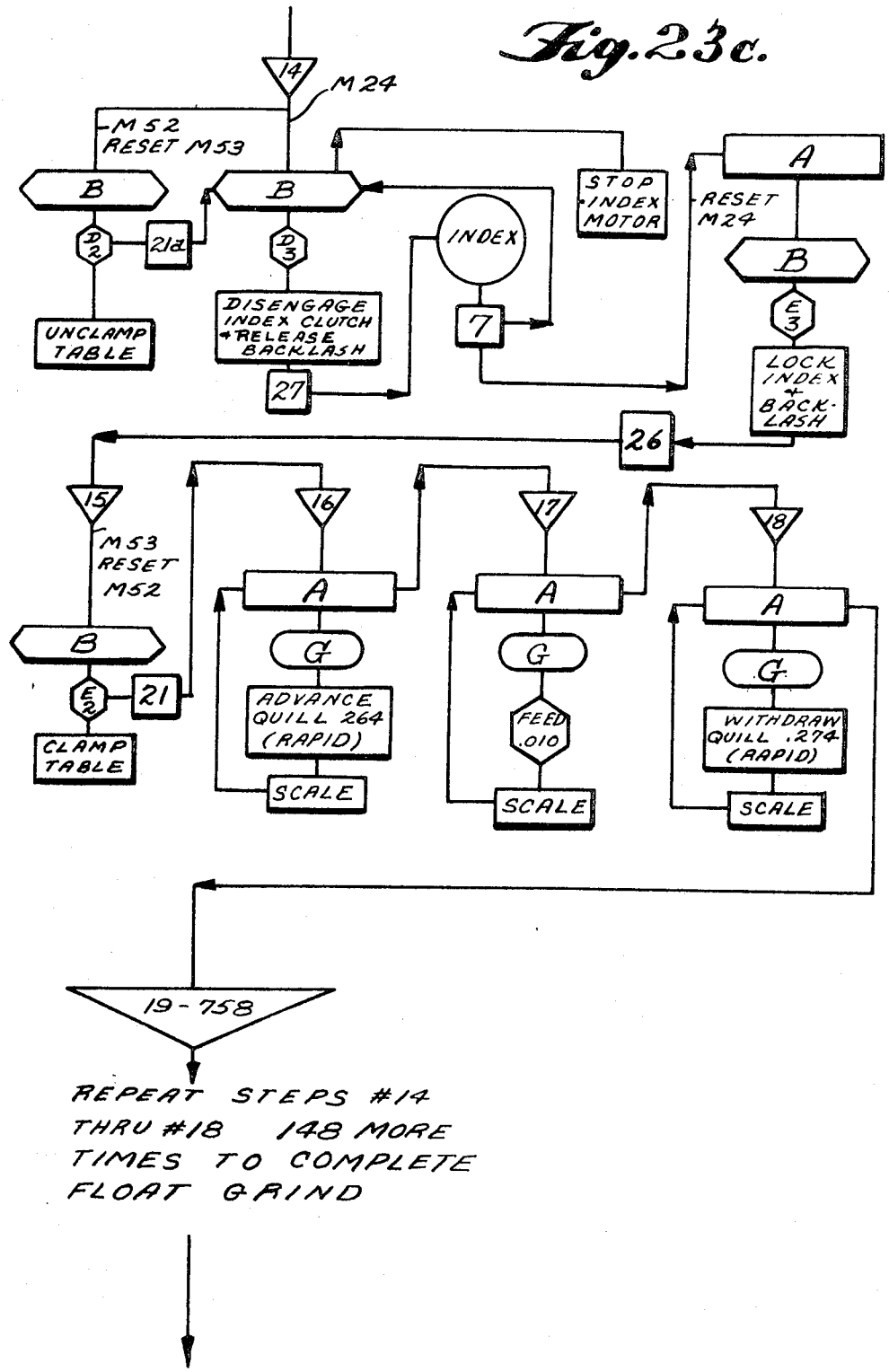

APPARATUS FOR GRINDING TOOTHED FACED MEMBERS

This is a division of our co-pending application Ser. No. 803,683 filed Mar. 3, 1969 and now U.S. Pat. No. 3,640,030 dated Feb. 8, 1972.

BACKGROUND AND OBJECTS

The present invention relates to toothed face members, such as couplings and clutches, and to structures for producing the same. Toothed face members of this type and structures for the production thereof are disclosed in United States patents Nos. 2,384,582, 2,427,641 and 2,558,203.

Toothed face members, such as couplings, customarily need to be precision face splines for joining members together to form a single operating unit. Their mating convex and concave teeth are ground or cut from the solid into the faces of the parts to be connected, and the resulting accuracy and uniformity preferably are such that parts can be interchanged, replaced, assembled or disassembled while maintaining alignment, balance and concentricity, as is understood.

The present invention was designed to provide improvements in structures for use in the production of toothed face members, such as couplings or clutches. In designing the present invention, consideration was given, among other things, to the growing needs of the turbine industry for coupled assemblies of greater size. Accordingly, one of the objects of the present invention is to provide structures capable of handling the present and the anticipated future needs of this industry and other large industrial manufacturers by providing a means of coupling together large turbine or other complex assemblies simply, accurately and economically. A related object is to provide an automatically operating high speed machine for grinding toothed face members with a high degree of precision and at improved production rates, and also with capacity for producing toothed face members of larger size than has been heretofore possible with existing machinery. In this latter connection, the present invention contemplates the provision of a horizontal work table for mounting the work in a horizontal plane whereby the table will support the full weight of the work so as to minimize or eliminate any unnecessary forces acting on the workpiece, itself. Furthermore, a horizontal work table arrangement will facilitate loading and unloading, especially of cumbersome workpieces, and inspection will also be facilitated. Moreover, providing a horizontal work with will permit degree seating of a control coupling member when it is placed upon the work, resulting in convenient and consistent inspection.

While consideration was given to the needs of the turbine industry in designing the present invention, it will be understood that the methods, structures and principles of the present invention may be utilized in other industries and in other applications, as will be evident.

A further object of the present invention is to provide methods and structures for producing toothed face members with a higher degree of accuracy so that tooth-to-tooth spacing and first-to-last tooth spacing can be consistently held within close limits.

Another and more general objective is to enable a machine of the type under consideration to be operated automatically through a series of cutting cycles or passes and including operations for dressing the grinding wheel.

In the exemplary embodiment of the invention disclosed herein, the grinding wheel is mounted on a feed quill and an automatic electrical control system is provided for periodically withdrawing the feed quill and grinding wheel a sufficient distance from the worktable so that a dressing tool assembly may be mounted in operative position to the grinding wheel for a dressing function, as referred to above; after a dressing operation, the automatic control system will effect removal or withdrawal of the dressing tool assembly and will feed the grinding wheel into the workpiece for grinding, in a predetermined number of tooth slots, before the next dressing function. Novel structures are provided in operative relation to the feed quill for effecting automatic oscillation of the feed quill and grinding wheel carried thereby during a dressing operation for the purpose of producing the desired grooves or undulations in the cutting surfaces of the grinding wheel.

The present invention contemplates the use of an electrical control system associated with novel structural arrangements providing for precision sequencing and precision control over the movements of parts during dressing and cutting operations, and including precision indexing of the workpiece, especially during finish cutting, so as to improve over-all machine accuracy and operation in order to produce more uniform and more precise workpieces. In this regard, it is contemplated in the exemplary embodiment of the invention that the electrical system operate in conjunction with tape means having information as to the various desired machine operations arranged or stored therein to be read by the control system to determine and govern machine operation in accordance therewith.

Still another object of the present invention resides in a novel in-process or adaptive gauging scheme utilized preferably in the finish grinding stage and wherein corrections and adjustments in the feeding motion between the tool and work will be made automatically, as needed (for example, due to wearing away of the cutting surfaces of the grinding wheel), so as to provide a more uniform and precise tooth-to-tooth spacing in the work. More particularly, it is contemplated that the gauging scheme involve readings or measurements taken of previously finish-cut tooth slots, that comparisons be made between those readings and a standard reading indicating the desired finish tooth slot size, and that subsequent finish cutting steps in subsequent tooth slots be corrected or modified depending on any deviations from the standard size that may be indicated by the readings taken on the previously finish-cut tooth slots. In the exemplary embodiment of this feature of the invention, a gauging probe is provided to be successively and periodically inserted into the finish-cut tooth slots, after they have been finish cut, and before the next successive tooth slot is finish cut, and an electrical control system is provided to operate in conjunction with the probe and the feeding structure for the grinding wheel to modify or correct the cutting stroke or feed of the grinding wheel depending on and in accordance with variations from the proper tooth size as indicated by the gauge probe. And, if desired, means may be provided in combination with the electrical control system to store the information as to the size of each tooth slot for each workpiece, as read through the probe, and this information may be placed on a tape or the like for future reference in connection with the related workpiece.

Other objects of the invention relate to various improvements in combinations and sub-combinations, as will be evident, whereby toothed face members of greater quality and of desired size may be automatically and economically produced. It is contemplated, as indicated, that there may be several roughing cycles or passes in combination with periodic interruption of the rough-cutting cycle for dressing of the grinding wheel in the manner referred to. It is further contemplated that after the roughing passes have been completed, the workpiece be given a float-grind cut to condition the wheel for a later finish grind operation, and also to provide greater uniformity in the size and depth of the tooth slots prior to the finish grinding operation. And during finish grinding, it is contemplated in the exemplary embodiment of the invention, that the workpiece be automatically indexed, with a high degree of precision, for each successive finish cutting step for each tooth.

Further objects and advantages of the invention will be in part obvious and in part pointed out hereinafter.

The novel features of the invention may best be made clear from the following description and accompanying drawings in which:

DESCRIPTION OF DRAWINGS

FIG. 5 is an enlarged elevational and fragmentary view of part of an exemplary control arrangement for controlling axial or linear movements of the feed quill and grinding wheel.

FIG. 6 is an enlarged, elevational view of an exemplary releasable lock-up device that may be used in connection with the structure shown in FIG. 5.

FIG. 10 is an enlarged fragmentary and schematic plan view of an exemplary arrangement of three rotary dressers for use in dressing and grooving the grinding wheel.

FIG. 11 is an elevational view of the dresser arrangement shown in FIG. 10.

FIG. 12 is an enlarged, fragmentary perspective view of an outside region of a grinding wheel including an exemplary arrangement of grooves formed therein according to the invention.

FIG. 13 is an enlarged fragmentary perspective view of an inside region of the grinding wheel of FIG. 12.

FIG. 14 is an enlarged schematic and diagrammatic view of an exemplary embodiment of the gauge probe and associated electrical controls for use during finishing.

FIGS. 15-20 are enlarged and fragmentary schematic views showing the gauging probe of FIG. 14 in a sequence of steps during finishing.

FIGS. 22a-e constitute diagrams designed to be arranged together, as will be understood, so as to constitute a single flow chart indicating an exemplary sequence of controls and operations in connection with dressing the grinding wheel and rough cutting operations for producing a workpiece with roughed-out tooth slots therein.

FIGS. 23a-g constitute diagrams designed to be connected together, as will be understood, so as to constitute a single flow chart indicating an exemplary sequence of controls and operations in connection with dressing the grinding wheel and effecting float grinding and finish grinding operations.

FIG. 24 provides a legend for the flow charts shown in FIGS. 22a-e and 23a-g.

DETAILED DESCRIPTION

Figure 1:
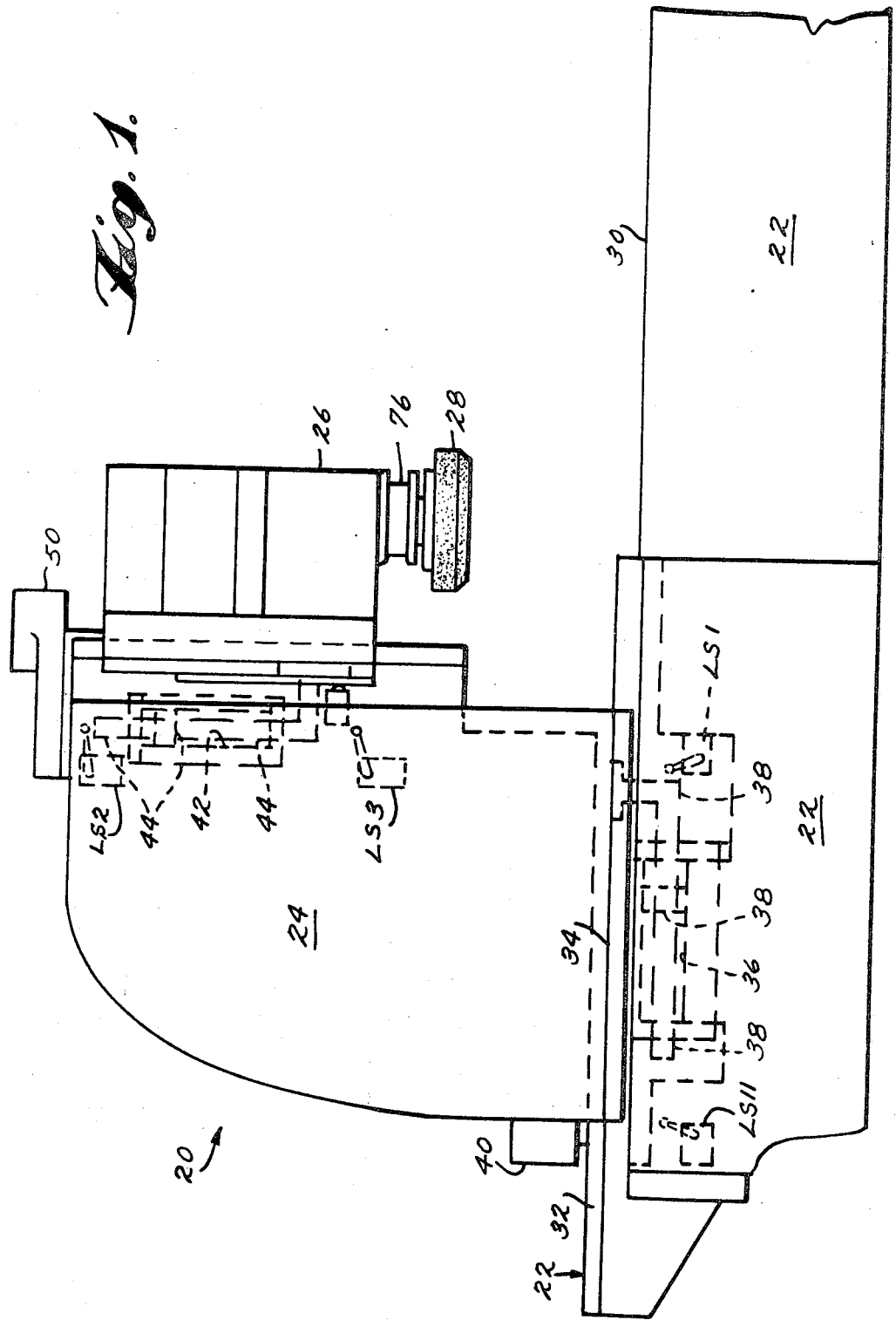
FIG. 1 is a side elevational view of a machine constituting an exemplary embodiment of the invention and with certain parts omitted for convenience of illustration.
Figure 3:
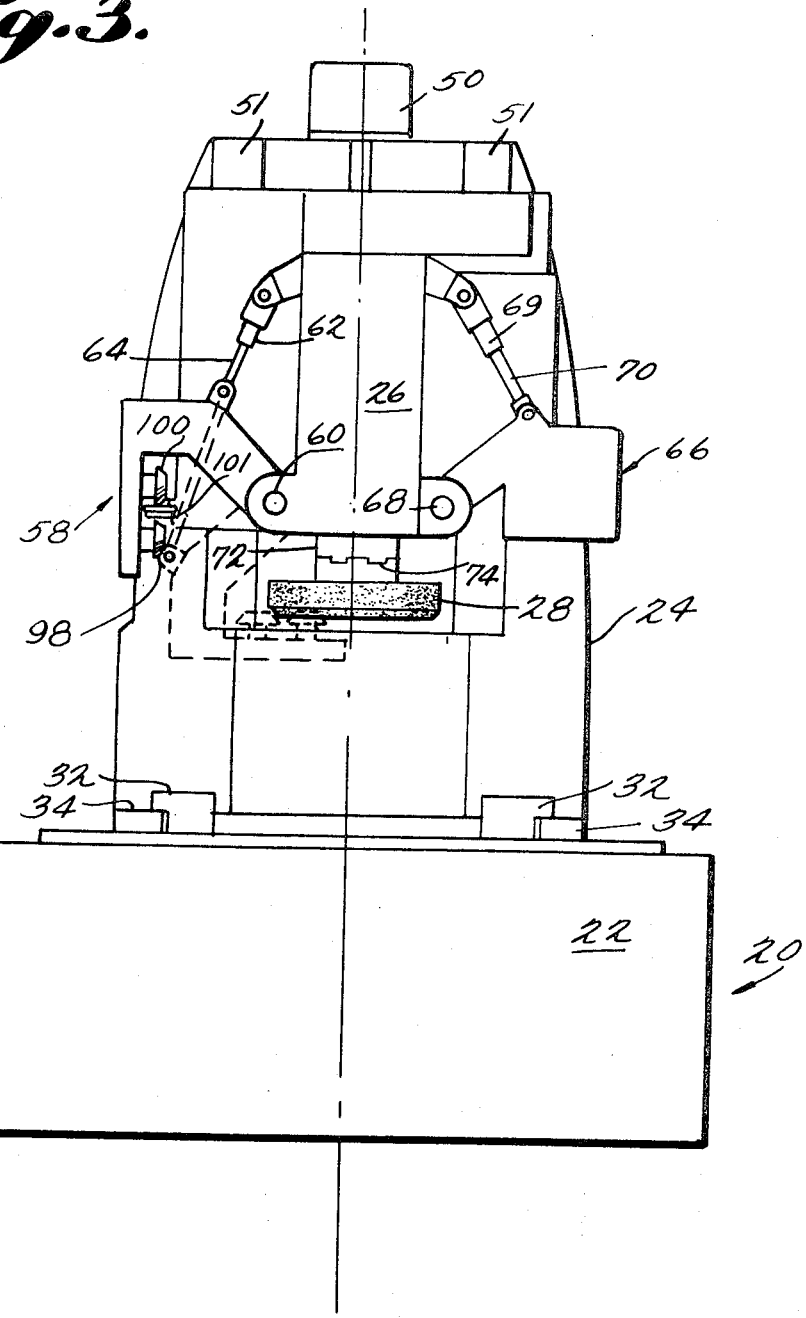
FIG. 3 is a front elevational view of the structure shown in FIG. 1, and with exemplary dresser assemblies shown schematically in their retracted positions.

Referring now to the drawings wherein like reference numerals indicate the same or corresponding parts, the machine 20 constituting an illustrative embodiment of the invention is shown in FIG. 1 as including a base means 22, a tool supporting column 24, a wheel housing or vertical slide 26, a grinding wheel 28, and a work table 30. The tool supporting column 24 is suitably mounted for limited horizontal, reciprocatory movement on the base means 22, and as shown, the base means includes two spaced rails 32 and the tool supporting column 24 includes rails or gibs 34 slidably engaged thereto, as best seen in FIGS. 1 and 3, for this purpose. A hydraulic cylinder 36 and piston 38 arrangement are provided, as shown in FIG. 1, for effecting horizontal movement for the tool supporting column. This piston and cylinder arrangement may be connected in any suitable manner to the base means 22 and column 24, so that movements of the tool supporting column may be under the control of hydraulic pressure, and limit switches, LS Nos. 1 and 11, are arranged in the path of movement of the piston rod to define limit positions for the movement of the column 24 in either direction, as will be understood.

These movements of the column 24 under the action of the piston and cylinder arrangement 36, 38 will be effected in connection with loading and unloading of the workpiece on the work table 30, as will be appreciated, inasmuch as it is desired to have the wheel housing 26 on column 24 in a withdrawn and retracted position during work loading and unloading operations.

After a workpiece has been loaded in position on the work table, the column 24 will be advanced under the action of the piston and cylinder arrangement 36, 38 and inasmuch as it is contemplated that workpieces of varying sizes (within a predetermined range) may be utilized, suitable provision is also made for finer adjustment of the horizontal position of the column 24 after it has been advanced forward to the limit position defined by LS No. 1 (to the right as viewed in FIG. 1). Such means is shown as including a motor 40 arrangement at the rear of the column 24 and suitably operatively connected to the base means 22 and column 24 to provide for fine adjustment of the horizontal position of the vertical axis of the grinding wheel 28 in accordance with the size of the workpiece to be operated upon. Although not shown, the motor 40 may be connected to the column 24 through a conventional telescoping shaft connection to a lead screw and nut arrangement for these fine adjusting movements of the column.

Suitable means are provided for effecting vertical movements of the vertical slide or wheel housing 26 relative to the tool supporting column 24. As shown, such means include a cylinder 42 and piston 44 arrangement suitably connected to the column 24 and wheel housing 26 to place movements of the latter under the control of hydraulic or fluid pressure, and limit switches LS Nos. 2 and 3 are provided in the path of movement of the piston rod 44 to define upper and lower limit positions for the movement of the wheel housing, as will be evident. The tool supporting column, as best seen in FIG. 2, is provided with laterally outwardly extending flanges 46 designed to be slidably engaged to inwardly extending gibs or flanges 48 on the wheel housing 26, and tongue-in-groove type structures 51 are also shown as being provided in the tool support column and wheel housing.

The advance and withdraw movements provided by the piston and cylinder arrangement 42, 44 for the wheel housing 26 will be effected, for example, in connection with dressing operations, as will become apparent, and when it is desired to begin a cutting or grinding operation, the wheel housing will be advanced downwardly the full amount permitted by this piston and cylinder arrangement, and it is contemplated that additional means be provided whereby further and finer adjusting movements of the vertical position of the grinding wheel 28 may be effected, as required by the size of the workpiece, as will be appreciated. Such means is shown in FIG. 1 as including a motor 50 mounted on the column 24 and suitably connected to the wheel housing, for example, through a lead screw and nut (not shown) to properly position the cutting end of the grinding wheel in a predetermined plane, called for convenience the "Datum No. 1 and Dresser Line," as determined by the size and dimensions of a given workpiece. This motor 50 will be actuated to provide this more precise positioning of the wheel housing after it has been fully advanced downwardly due to actuation of the hydraulic cylinder and piston arrangement 42, 44.

Figure 2:
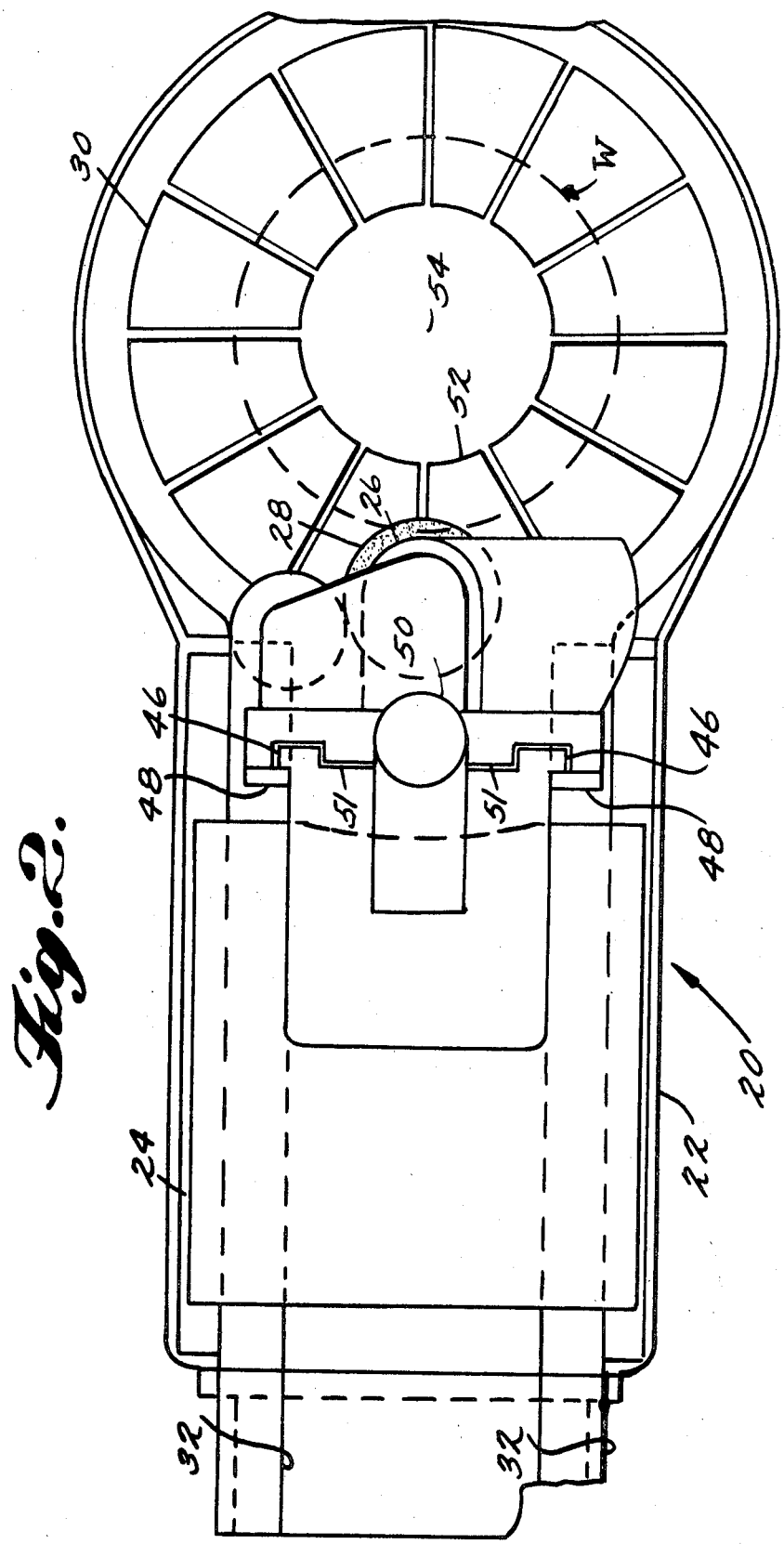
FIG. 2 is a plan view of the machine as shown in FIG. 1.

The work table 30 is shown in FIG. 2 as being of generally circular configuration having a bore 52 therein, and it is designed to receive the work W (indicated schematically by dashed lines in FIG. 2) with the axis of rotation thereof disposed vertically so that the full weight of the workpiece will be borne entirely by the work table and base means 22. Suitable means (not shown) will be provided for fastening the work to the table and for supporting the table and work fo rotation about the central vertical axis 54. Means will also be provided for effecting rotary movements of the work table 30, as desired, such as during tramming and indexing, as will be understood, and an exemplary arrangement of such means is disclosed in the copending application, Ser. No. 803,752 (issued Mar. 23, 1971 as U.S. Pat. No. 3,572,175), entitled Indexing Mechanism, filed of even date herewith. The disclosures of that application are incorporated herein by reference.

The grinding wheel 28 is shown as being connected to a feed quill 76 slidably mounted in the wheel housing 26 and, as shown, the grinding wheel is of cup-shaped configuration having cutting surfaces in the annular lip at the lower end thereof, and suitable dressing means will be provided for periodically dressing these cutting surfaces, as will be understood. An exemplary arrangement of such dressing means, as best seen in FIG. 3, includes a first dresser assembly 58 suitably pivotally mounted to the wheel housing on brackets for pivotal movement about a horizontal axis indicated by pivot pin 60. A hydraulic cylinder 62 and piston 64 arrangement is shown connected to the wheel housing 26 and dresser assembly 58 to effect movement of the dresser assembly between an upper withdrawn and a lower operative position (shown in FIG. 4) relative to the grinding wheel 28, as will be understood.

A second dresser assembly 66 is also shown as being provided on the right hand side of the wheel housing, as viewed in FIG. 3, and this dresser assembly is also shown as being pivoted to the wheel housing for pivotal movement about a horizontal axis 68 through operation of cylinder and piston arrangement 69, 70.

In an exemplary arrangement, the dresser assembly 58 includes three rotary dressing wheels 98, 100, 101 (see FIGS. 4, 10 and 11) and exemplary structures for adjustably mounting these wheels are disclosed in more detail in the copending application, Ser. No. 803,751 (issued Aug. 10, 1971 as U.S. Pat. No. 3,598,100), entitled "Dresser Structures," filed of even date herewith, and the disclosure of that application is incorporated herein by reference. This dressing assembly will be utilized in connection with dressing the grinding wheel for rough cutting operations, as will be described in more detail hereinafter; however, it will be understood that this same dressing assembly may be utilized for dressing the grinding wheel in connection with finishing operations, as desired, and in that case, the other dressing assembly 66 may be entirely omitted from the machine.

The dressing assembly 66, if used, will be operated in connection with the dressing function in the float grinding and finish cutting stage, and it may be of conventional construction including single point diamond dressing tools, as disclosed in the U.S. Pats. Nos. 3,395,544 and 2,427,641.

WHEEL HOUSING AND FEED QUILL ASSEMBLY

Figure 4:
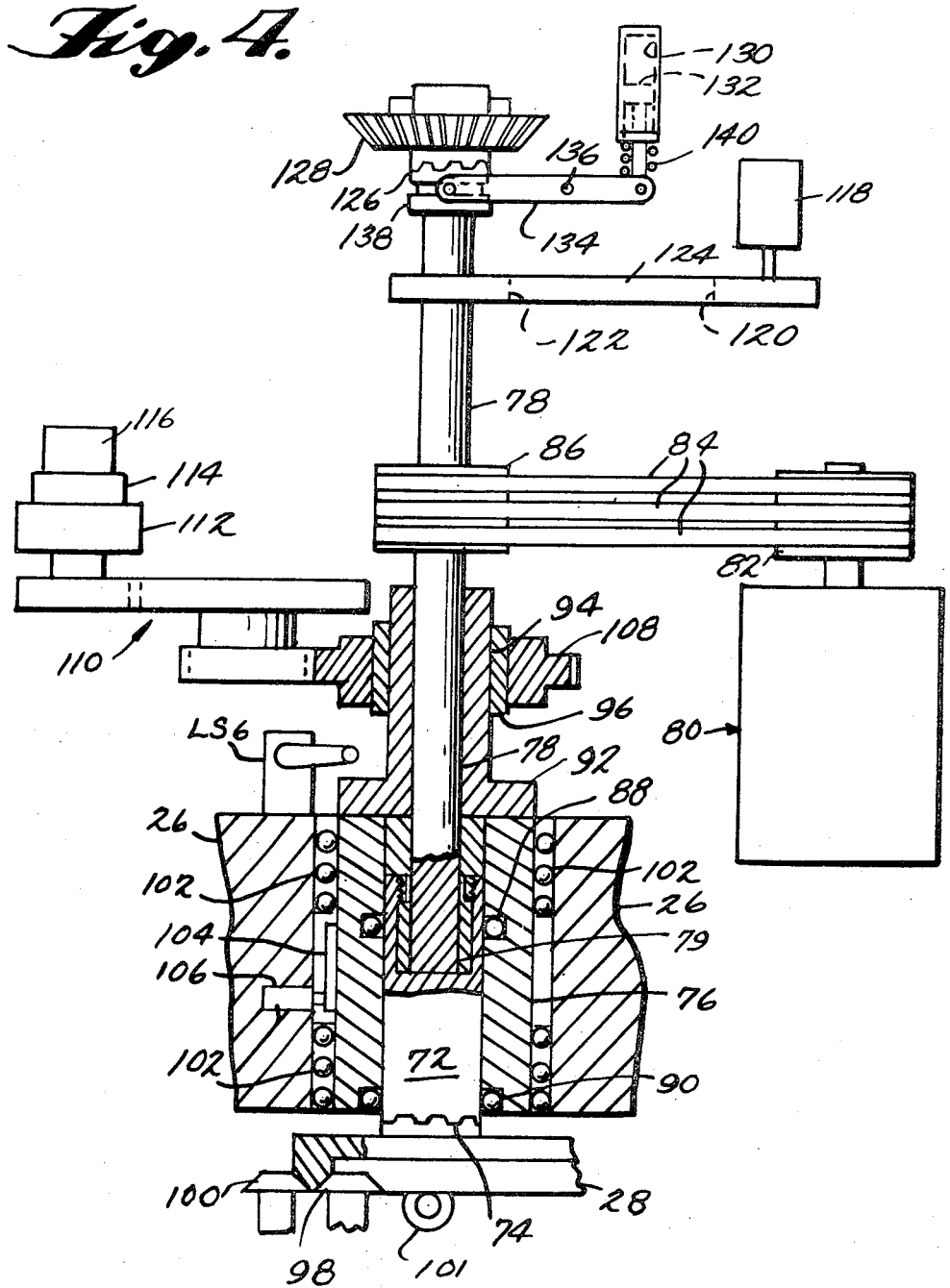
FIG. 4 is an enlarged and somewhat schematic and fragmentary vertical sectional view of the wheel housing, feed quill, grinding wheel, and associated structures, embodying the invention.

As shown in FIGS. 3 and 4, the grinding wheel 28 is connected to a spindle 72 as by a face clutch 74, and the spindle 72 is journaled in a feed quill 76 which in turn is suitably slidably disposed within the wheel housing 26. The spindle 72 is drivingly connected at its upper end to a shaft 78 shown as being drivingly connected to a motor 80 through a series of pulleys 82, belts 84 and pulleys 86. The shaft 78 is suitably drivingly connected to the spindle 72 so that the spindle may have limited vertical or coaxial motion relative to the shaft 78 without impairing the driving connection thereto. For this purpose a spline connection may be provided at the bottom of shaft 78, as indicated by numeral 79.

Bearings 88, 90 are provided between the spindle 72 and the feed quill 76, as shown, and the upper end of the feed quill is shown as being suitably connected to a flange 92, as by bolts (not shown), the flange 92 being shown as integral with a ball screw 94 which is part of a ball screw and nut 96 assembly designed to provide vertical movements of the quill 76 and grinding wheel 28 relative to the wheel housing 26 and shaft 78. Thus, the screw 94 will be slidable on the shaft 78 and means are provided to connect the screw 94, quill 76 and spindle 72 for vertical movement as a unit while permitting rotation of the spindle 72 relative to the screw 94 and feed quill 76. Suitable means will also be provided to prevent rotation of the screw 94 so that rotation of the nut 96 will effect axial or vertical movement of the screw and no rotational movement thereof. These vertical movements of the feed quill and grinding wheel will occur in connection with dressing and cutting operations as will become apparent.

FIG. 4 shows two rotary, side dresser wheels 98, 100 and the end dresser wheel 101 in exemplary dressing positions relative to the grinding wheel. However, it will be understood that these dressing wheels will be withdrawn and elevated away from the grinding wheel when it is desired to perform a cutting operation on the workpiece.

A bearing 102 is shown as being provided between the feed quill 76 and the wheel housing 26 and a structure, in the form of a scale 104 and head or reader 106, is shown as being provided on the feed quill and wheel housing, respectively, to be utilized in conjunction with the electrical control system as will be discussed in more detail hereinbelow. The scale 104, in the exemplary embodiment, is composed of a plurality of vertically spaced lines constituting a grating, and the head or reader 106 is designed to operate in connection with the scale grating 104 to indicate precisely the vertical position of the feed quill 76. This scale 104 and head 106 will operate through a feedback connection to the electrical control system, to be described in more detail hereinbelow, whereby the vertical positioning of the feed quill 76 and grinding wheel 28 may be effected with a high degree of precision.

Limit switches identified as LS 6 and LS 19 are provided on the wheel housing as shown in FIGS. 4 and 5. LS 6 will define the feed quill "up" position and LS 19 is positioned for engagement by the DCDT, as will be described.

The nut 96 of the ball screw and nut assembly is shown as being carried by a gear 108 which in turn is shown as being drivingly connected through a gear train arrangement 110 to a motor 112. In the exemplary arrangement shown, motor 112 is a hydraulic motor, and a control therefor in the form of servo-valve 114 operatively connected to the electrical control system, to be described later, is provided in connection with controlling the vertical position of the grinding wheel and feed quill relative to the wheel housing 26. And a conventional tachometer 116 is shown above the valve 114 to be used in connection with a feedback control, as will become apparent.

A tachometer 118 is shown as being drivingly connected to the shaft 78 through the pulleys 120, 122 and belt 124, and it is utilized in combination with the electrical control system for regulating or controlling the speed of rotation of the motor 80 and shaft 78, as will become apparent.

At the upper end of the shaft 78 a conventional clutch 126 is provided for releasably drivingly connecting the shaft 78 to a bevel gear 128. Suitable actuating means in the form of a hydraulic cylinder 130 and piston 132 arrangement are provided for engaging or disengaging the clutch through the lever 134 pivoted at 136 and connected at one end to the piston 132 and at the other end to a collar 138 carrying the clutch member, as shown. A compression spring 140 is provided for urging the clutch to an engaged position, and fluid pressure in the chamber below the piston head 132 will release the clutch.

The gear 128 drives a pinion gear 140, as shown in FIGS. 4 and 5, and this pinion gear is drivingly carried by a shaft 142 which drivingly connects through change gears 144, 146 to a shaft 148 carrying a multi-lobed cam 150. The change gears 144, 146 may be replaced by gears of a different ratio, as desired, for a purpose to become apparent as the description proceeds. A cam follower in the form of a roller 152 is arranged below the cam 150, and journaled in a bifurcated end of a bracket 154 so as to be rotatable about a horizontal axis, as will be evident. The position of shaft 148 will be fixed within the wheel housing and will serve as a reference point or level for the purpose of determining a null position for dressing of the wheel, as will become evident.

Also fixed to this shaft 148 is a lock-up device including a disc-like member 156 formed with a notch 158 therein designed to be releasably lockingly engaged by a pin or detent 160 secured to a vertical reciprocal piston rod 162 slidably disposed within a hydraulic cylinder 164, as best seen in FIG. 6, for actuation downwardly to a locked position or upwardly to an unlocked position, through the introduction of fluid pressure into the chamber above or below the piston head, as will be evident. A limit switch, LS 10, is shown as being arranged above the piston 162 to define an upper limit position wherein the detent 160 is released or withdrawn from the notch 158 sufficiently so as not to interfere with rotation of the disc 156.

Shaft 148 is also shown as carrying another cam 166 designed to operate a limit switch, LS 9, as will be referred to hereinbelow, and LS9 is shown connected to a variable counter 168 which serves a purpose to become apparent as the description proceeds.

Depending from the bracket 154 supporting the cam roller 152 is a rod 170 terminating in a core 172 for a coil 174 of a conventional DCDT (i.e., a direct current displacement transducer). The coil 174 will be suitably arranged, for example, in a housing or casing 176, and a compression spring 178 is shown encircling the rod 170 and acting on the bracket or yoke member 154 at one end thereof and the coil housing 176 at the other end thereof for urging the cam follower 152 upwardly into engagement with the cam 150.

The DCDT coil housing 176 is shown as being carried by a mount 180 suitably connected to the feed quill 76 for vertical slidable movement relative thereto. A stepping motor 182 of conventional construction is shown as being arranged below the DCDT and fixedly connected to the feed quill, as indicated. The output shaft 184 of this stepping motor carries a gear 188 drivingly engaged to another gear 190 which in turn carries a threaded member or ball screw 192 fixedly secured thereto at the lower end thereof and threadedly engaged in the mount 180, as shown. The stepping motor 182 is a reversible motor, and rotation thereof will effect vertical movement of the mount 180 either upwardly or downwardly relative to the feed quill 76. Such vertical movement of the mount 180 will be accompanied by a similar vertical movement of the DCDT coil housing 176. The purpose of this structure and its operative connection to the electrical control system will become apparent as the description proceeds.

Although FIGS. 4, 5 and 6 are somewhat fragmentary and schematic, for purposes of simplifying this description, it will be understood that the various structures and connections shown may be suitably arranged within the wheel housing and/or the tool support column.

There are different reasons for having axial motion of the grinding wheel 28 in connection with a number of separate functions, and these functions will be controlled in different ways, as will become apparent. One of these functions is the feed function in connection with grinding a work piece. This function will be controlled by the servo valve 114 and servo motor 112, through the gear train 110 and the ball screw and nut 94, 96. Besides this feed motion for cutting, there is also a feed motion of the grinding wheel utilized in connection with dressing operations wherein the same servo valve, servo motor and gear train are utilized for advancing the feed quill 76 and grinding wheel to remove stock from the wheel at the time of dressing. Another axial feeding motion of the grinding wheel contemplated in the invention is an oscillating feed motion of the grinding wheel, in connection with dressing, to enable grooves or an undulating configuration to be formed in the cutting surfaces of the grinding wheel. This oscillating feed is effected through the drive from the wheel spindle shaft 78 through the clutch 126, gears 128, 140, 144, 146, shaft 148 and the cam 150. Rotation of the cam 150 will effect oscillation of the cam follower 152 and core 172 which, in turn, through the DCDT coil 174 and the electrical control system will effect a corresponding oscillation of the feed quill and grinding wheel 28. Thus, oscillating motion of the feed quill and the grinding wheel will be produced by motion of the DCDT core 172 and coil 174 following on the cam 150 as a tracer unit. Any displacement from a null position for core 172 and DCDT coil 174 will be capable of producing a varying electrical output which will be arranged to control the servo valve 114 to produce an oscillating feed to the feed quill and grinding wheel.

One of the purposes for producing the grooves in the cutting surfaces of the grinding wheel is to facilitate penetration of coolant to the areas being cut, during a cutting operation, and to permit swathe or waste material to be carried away. This will enable the wheel to grind stock at a faster rate, and otherwise improve the grinding operation, as will be apparent.

The number of grooves cut in the grinding wheel during dressing can be varied, as desired. This may be accomplished, for example, through selection of change gears 144, 146 of desired ratio, so that the multi-lobed cam 150 will rotate faster or slower, as desired, in relation to the speed of rotation of the grinding wheel. Thus, the number of lobes on the cam 150, and the ratio for the change gears 144, 146 will determine the number of grooves imparted to the cutting surfaces of the grinding wheel, as will become apparent.

It should also be noted that the stepping motor 182, as indicated, operates to drive the mount 180 which carries the casing 176 of the DCDT coil 174 so that when the grinding wheel is initially fed into the dressers, during a dressing operation, and before the grinding wheel begins to rotate, the stepping motor will compensate for that advance and bring the DCDT coil back to its null position relative to its core 172, through the electrical control system, as will become apparent. Thus, the DCDT coil will always be made to seek its null position relative to its core 172. Any time that null position is lost during the above-described initial feed, either by movement of core 172 or coil 174, there will be a signal back to the stepping motor to move the DCDT coil casing 176 the amount necessary to reestablish the null position.

ELECTRICAL CONTROL SYSTEM

Figure 7:
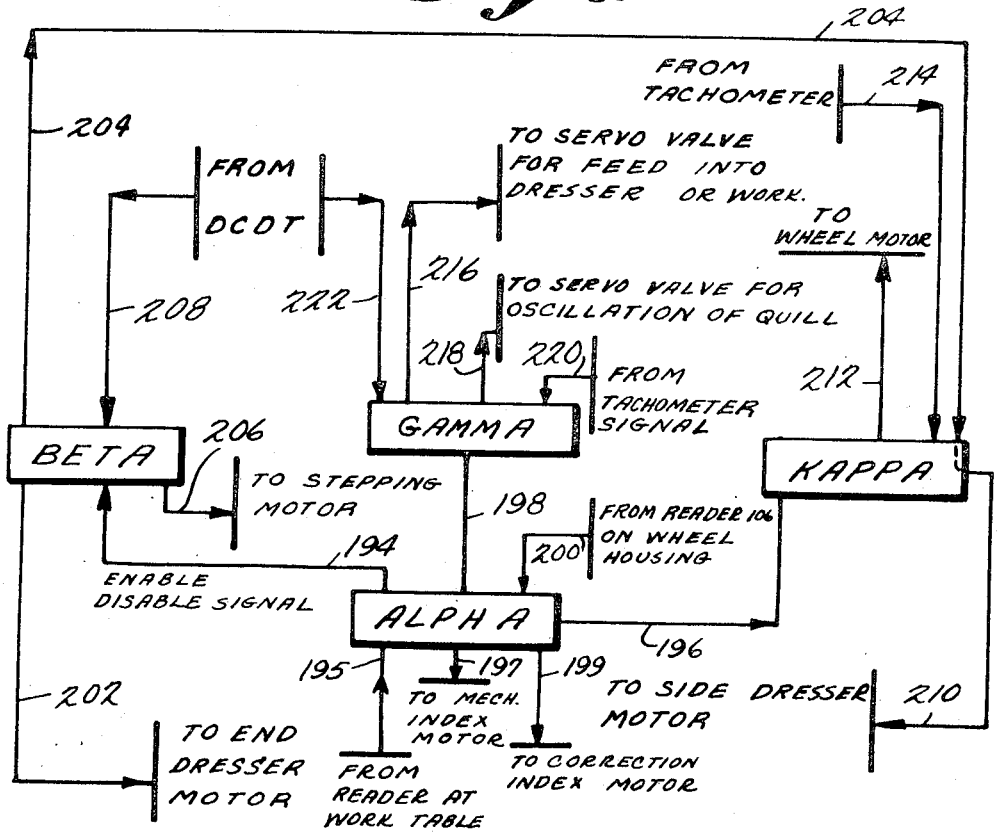
FIG. 7 is a block diagram showing an exemplary arrangement of electrical controllers designed to control machine operation, and indicating their connections to each other and to other structures in the machine.

An exemplary arrangement of an electrical control system designed for use in the invention is shown in block diagram form in FIG. 7. As there shown, the system includes a plurality of electrical controllers or control circuits identified as Alpha ( or "A"), Beta (or "B"), Kappa (or "K") and Gamma (or "G"), and solid state circuitry preferably is employed. These controllers will be connected together and also connected to various structures in the machine for controlling the operation thereof in a manner that will become apparent.

The Alpha controller will be the main controller, for the machine, and it is contemplated that it be a controller utilizing a tape on which information is stored. For example, paper-tape information may be inserted through a fast electro-optical tape reader having tape spooling or simple tumble-box, as required. The tape reader reads the information on the tape as the latter is conveyed through the controller and effects the desired machine functions in the desired sequence through connection to the other controllers and other structures in the machine, as will be understood.

The other controllers, namely, Beta, Kappa, and Gamma, will be designed to operate in conjunction with the Alpha controller and with other structures as will be described, and these controllers may be of any suitable design including appropriate circuitry and electrical components for carrying out the desired functions in conjunction with the operation of the main Alpha controller.

The Alpha controller is shown as being connected to the Beta controller by line 194 which provides an "enable or disable" signal to the Beta controller, as will become evident. Likewise, lines 196, 198 connect the Alpha controller to the Kappa and Gamma controllers, respectively, as will be understood. Another line 200 connects the Alpha scale head 106 on the wheel housing to the Alpha controller, as shown. The reader or scale head 106 and linear grating 104 may be designed to utilize the Moiré fringe grating method, as will be understood, so that line 200 will provide feed back information into the Alpha controller in connection with the movements of the feed quill. Line 195 leads to Alpha from a reader at a work table, and lines 197, 199 lead to indexing motors, as will be understood.

The Beta controller is shown as being connected by line 202 to the end dresser motor (not shown) for the rotary dresser assembly 58 referred to above, and another line 204 connects the Beta controller to the Kappa controller. Line 206 connects the Beta controller to the stepping motor 182, and another line 208 connects the DCDT coil back to the Beta controller, as shown.

The Kappa controller is shown as including a line 210 going to the side dresser motor (not shown) for the dresser assembly 58, and this line 210 is also in connection with the line 204 coming from the Beta controller, as shown. The Kappa controller also is connected to the wheel motor 80 by line 212 and a line 214 connects the tachometer 118 back to the Kappa controller, as shown.

The Gamma controller is shown as being connected to the servo valve 114 by line 216, and also by another line 218. These two lines will operate to control the functioning of the servo valve at different times in the machine cycle, as will become apparent. A line 220 is shown as being connected back from the tachometer 116 to the Gamma controller, and another line 222 is shown as connecting the DCDT coil 174 back to the Gamma controller.

Arrowheads on the connecting lines in FIG. 7 indicate the direction of the respective signals going between the controllers and from the controllers to other structures or returning from such structures. The sequence of operation of the various machine parts as controlled by the electrical control system and the operation of the electrical controllers will be discussed in more detail hereinbelow in connection with the description of an exemplary overall machine operation.

Figure 8:
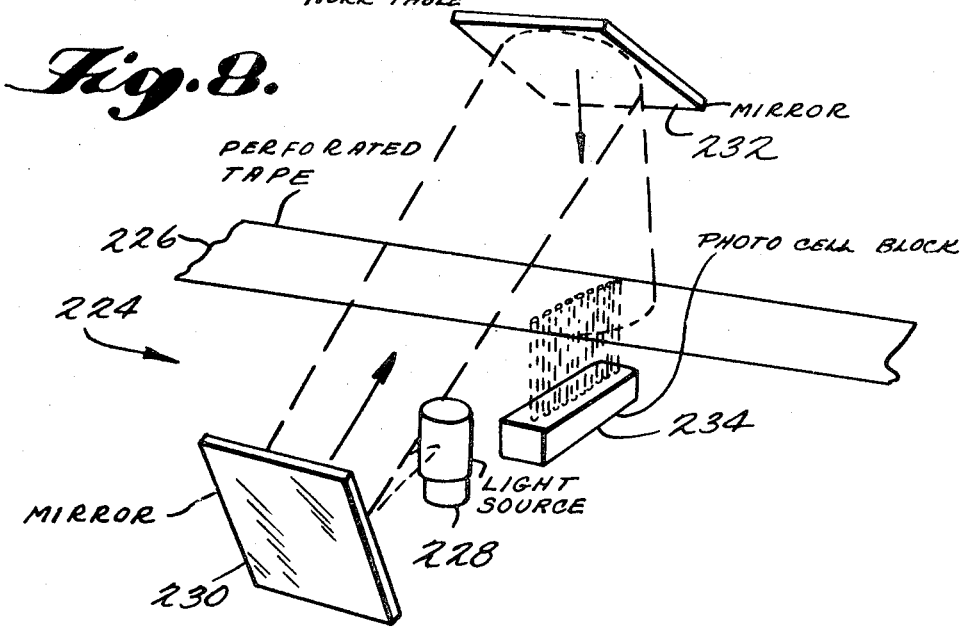
FIG. 8 is an enlarged, schematic view of part of an exemplary tape reader construction that may be utilized in the electrical control system.

FIG. 8 shows an exemplary arrangement in schematic form of a conventional tape reader 224 that may be utilized in the Alpha controller for reading the information on the tape 226. The reader 224 is shown as including a light source 228, mirrors 230, 232, and a photocell block 234, arranged as indicated.

As will be understood, suitable means (not shown) will be provided for moving the tape 226 through the tape reader 224 in step-by-step fashion, and the tape itself in the arrangement shown will have information in the form of holes or perforations punched therein in accordance with a predetermined scheme or program for effecting the desired machine functions in the desired sequence.

WORK TRAMMING AND INDEXING

Figure 9:
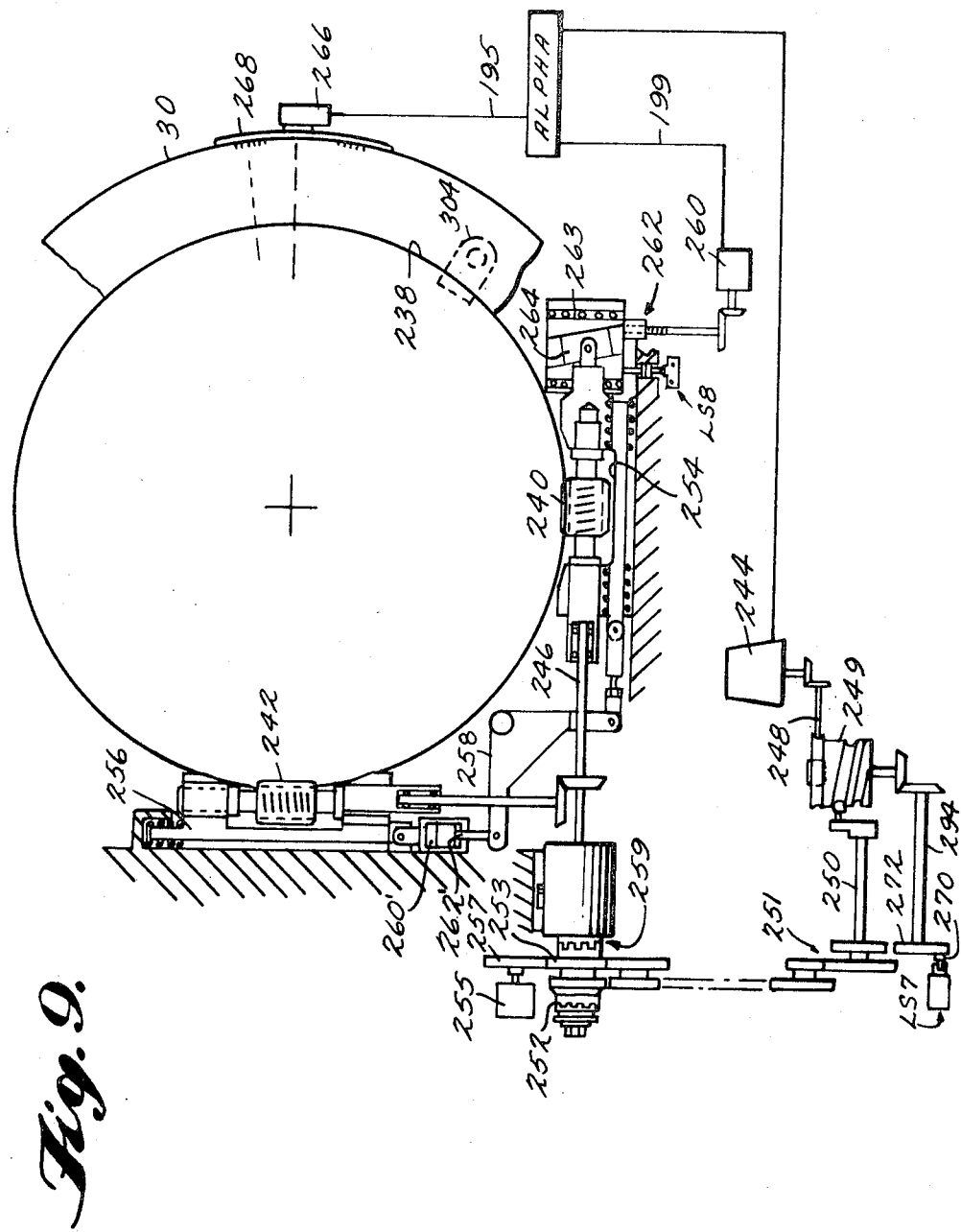
FIG. 9 is an enlarged, schematic plan view of the work table showing diagrammatically an exemplary arrangement for effecting rotary movements thereof for tramming and for mechanical and precision indexing.

FIG. 9 illustrates schematically a novel arrangement for work tramming and work indexing including provisions for precise indexing of the workpiece. This construction is disclosed in more detail in the U.S. Pat. No. 3,572,175, referred to above. This work indexing arrangement and related structures are claimed, per se, in that copending application; however, it is of particular utility in the present development and it was especially designed for use in machines of the type under consideration. It will be understood, though, to those skilled in the art, that this arrangement may be used in connection with other machines where precise indexing movements are required to be effected in step-by-step increments.

The work indexing arrangement 236 comprises a worm wheel 238 carried by the work table 30 and engaged by two worms 240, 242 disposed at right angles to each other, as shown. As contemplated, there will be a mechanical indexing step effected by the worm 240, and the other worm 242 will function as an antibacklash device, as described in the copending application just referred to. For effecting this mechanical index, a motor 244 is provided (under Alpha control through line 197) and it is connected to the shaft 246 for the worm 240 through the shaft 248, index cam 249, shaft 250, and a gear train 251 including gear 253 drivingly connected to shaft 246 through a clutch 252. The index cam 249 and the connections to shaft 246 for effecting this mechanical index may be of any conventional structure, such as that disclosed in U.S. Pat. No. 3,007,345. Suitable means such as motor 255 and gear 257 may also be provided for tramming the work piece during initial step-up, and an index lockup device 259 may be provided for gear 253, as disclosed in the copending application referred to above.

The worms 240, 242 are mounted on brackets 254, 256, as shown, and the bell crank lever 258 is connected to these brackets, as disclosed in the copending application just referred to. A hydraulic cylinder 260 and piston 262 arrangement is provided on the bracket 256 for use in connection with preventing backlash in connection with an indexing step, as is disclosed in the copending application. The bell crank lever 258 will also be utilized in connection with corrective indexing which will take place after the mechanical indexing and for the purpose of effecting a more precise indexing, as disclosed in the copending application.

In the exemplary arrangement shown, this corrective indexing function will be accomplished through a reversible motor 260 connected through a ball screw and a nut arrangement 262 to a carrier 263 for a wedge block or a sine bar 264 connected to the worm bracket 254 for effecting corrective indexing movements of the worm wheel, as is disclosed in the copending application. The operation of this corrective indexing motor 260 will also be under Alpha control through line 199, and an Alpha head or scale reader 266 is connected to the Alpha controller through line 195. This reader 266 is provided adjacent the work table to effectively take readings from a scale or linear grating arrangement 268 arranged for example, on the cylindrical peripheral surface of the work table, as indicated.

The linear grating 268 on the work table 30 and the Alpha head 266 may be of conventional form utilizing the Moiré fringe effect for providing a feedback signal to the Alpha controller to indicate when the work table has been moved through the precise, predetermined angular distance, as read from the gratings on the scale 268.

A limit switch, LS 7, is provided in the path of a projection 270 of gear segment 272 carried by shaft 274 driven by motor 244 whereby this switch will be arranged so as to be actuated upon completion of a mechanical indexing step to stop the motor 244 at that time. Another limit switch, LS 8, is provided adjacent the carrier 263 for the wedge block and it is arranged to be actuated during the mechanical indexing operation in connection with a withdrawal of the wedge carrier; during a subsequent corrective indexing step, this switch, LS 8, will be opened as the wedge carrier moves or advances away from it in connection with a corrective indexing function, as is disclosed in the copending application referred to above.

As will be understood, the pulse reader 266 is capable of reading that the work table has been indexed too much or not enough; however, in the exemplary embodiment of the invention, during each mechanical indexing step, the corrective indexing motor 260 will be operated to effect a subtraction from the mechanical indexing (through motor 244), so that each mechanical indexing step will always be less than the amount needed for a complete index. Thus, during corrective indexing, it is never necessary for the table to be backed up since the corrective indexing function will always be desirably in a forward direction, and the pulse reader will always read that the mechanical indexing step under control of motor 244 has fallen short of the desired position. The subtraction motion imposed on the mechanical indexing movement will be effected by a bodily translation of the worm 240 as disclosed in the copending application, and the rotary motion of the table 30 during mechanical indexing due to the rotation of the worm 240 will be greater than that which would be produced by the worm translation alone.

Accordingly, there will be a tape instruction from the Alpha controller to the corrective motor 260 to reverse during mechanical indexing, and this reverse rotation will continue until limit switch LS 8 is actuated. At that time the motor 260 will be stopped. For the corrective indexing step, the motor 260 will be operated in the forward direction, through the feedback line 195 and under control of the Alpha controller, and it will continue to rotate in that direction until the feed demand register in the Alpha controller indicates that the work table has reached the desired, predetermined position thereof for that particular indexing step. During corrective indexing, the motor 260 preferably will be operated at a varying speed. Initially, it will be operated at a relatively fast speed, then it will be slowed down as the work table approaches the desired precise, position thereof for that indexing step, and then it will be brought to an abrupt stop, precisely at the desired position of the table, as read by the pulse or tape reader in the Alpha controller, as will be understood.

ROTARY DRESSER ASSEMBLY 58

The structures for adjustably mounting the rotary dressing wheels 98, 100, 101 in the dresser assembly 58 and for effecting the rotation thereof during dressing operations are disclosed more fully in U.S. Pat. No. 3,598,100, referred to above. FIGS. 4, 10 and 11 illustrate exemplary positions of the dresser wheels in relation to the grinding wheel 28 when the assembly 58 is in position for a dressing operation. As shown in those Figures, the side dresser wheels 98, 100 engage opposite sides of the tapered cutting surfaces of the grinding wheel, and the end dressing wheel 101 is in engagement with the bottom end of the grinding wheel. The side dressing wheels 98, 100 may be provided with curved or rounded corners at the upper end thereof, so as to produce a chamfer in the grinding wheel, as will be understood. The side dresser wheels are shown of frusto-conical shape in axial section, and the end dressing wheel 101 may be of stepped configuration so as to dress the bottom end surface of the grinding wheel to desired angle and configuration and to provide for a blending radius with the side of the wheel. For example, the bottom end surface of the grinding wheel may be dressed so as to be inclined at an angle to the horizontal, in connection with forming a gabled bottom to the tooth slots in the workpiece, as disclosed in U.S. Pat. No. 2,558,203.

During a dressing operation preparatory to rough grinding of the work piece, the rotary dressing wheels 98, 100, 101 will be rotated and the grinding wheel blank will also be rotated, and in accordance with the invention, it is contemplated that an oscillating feed motion will be provided between the grinding wheel and these rotary dressing wheels, as discussed above, so as to impart a grooved or undulating configuration in the cutting surfaces of the grinding wheel.

The oscillating motion referred to, and the positioning and orientation of the axis of the end dressing wheel 101 relative to the rotary side dressing wheels 98, 100 may be predetermined so as to impart any desired relationship between the grooves in the end surface 271 of the grinding wheel, and the grooves in the tapering side cutting surfaces 273, 275. In the illustrative arrangement, these wheels 98, 100, 101 are so spaced and oriented in connection with a given oscillating movement of the grinding wheel that all the grooves or peaks and valleys in the three cutting surfaces of the grinding wheel will be aligned or in phase.

GRINDING WHEEL

An exemplary configuration of the grinding wheel 28 constructed in accordance with the invention is shown in FIGS. 11, 12 and 13. As there shown, the grinding wheel is of cup-shaped configuration including a central opening 277 in the web 279 thereof, and a cylindrical side wall portion 281 terminating in a cutting region at the free end or annular lip. The hole 277 in the web may be utilized in connection with mounting the grinding wheel on the spindle 72, and the cutting region is defined by the tapering or converging outer 273 and inner 275 surfaces, and the end surface 271. These cutting surfaces, as previously indicated, include grooves or a series of peaks 282 and valleys 284 adjacent the tip of the cutting region, and these configurations are produced during a dressing operation, as indicated. The peaks and valleys are all shown as being in phase with each other in going from one of these cutting surfaces to the other, and the purpose of these surface configurations is to enable coolant to be dispersed into, and waste material to be removed from, the deepest areas of the tooth being cut so as to improve the cutting operation.

The peaks 282 and valleys 284 in the surfaces 273, 275 are shown as terminating a relatively short distance from the end surface 271, and the peaks constitute an extension of the remainder of the respective tapering surface while the valleys 284 constitute grooves therein.

It will be understood, however, that these grooves 284 may be extended throughout a greater part of the height of the tapering surfaces 273, 275, if desired, and the number of these peaks and valleys in the cutting surfaces may be increased or decreased, as desired. Furthermore, the grooves 284 on the three surfaces may be arranged out of phase with one another, or in any desired relationship, as preferred for a given grinding operation.

With the grooves 284 in the grinding wheel 28, as disclosed, it is contemplated that the rate of depth feed of the grinding wheel into the work may be increased substantially so as to shorten production time.

GAUGING PROBE

The present invention also contemplates a novel method and means for adaptive or in-process gauging designed to be utilized during the finish grinding stage in order to make corrections for and prevent the build up of any errors in tooth slot size. In the exemplary arrangement of this feature of the invention, as shown in FIGS. 14–20, there is provided a gauge probe 286 as part of the LVDT (i.e. a linear velocity displacement transducer) probe assembly 288. This assembly may be mounted in the machine by suitable structure; for example, it may be mounted or carried in a bracket (not shown) connected to the wheel housing 26 and adapted to be swung between operative and non-operating positions. Thus, during rough grinding and float grinding, the LVDT probe assembly will be withdrawn into a non-operating position, and prior to finish grinding, it will be moved into an operative position above the workpiece so that the gauge probe 286 may be inserted into the tooth slots to take readings thereof, during finish grinding operations, as will be described in more detail hereinbelow. In this connection, it might be noted that the probe 286, during finishing operations, will be lowered into a tooth slot that has already been finish-cut, and it will make contact with the side surface of the tooth slot, as indicated in FIG. 14. The probe will be laterally displaced a certain distance in the horizontal plane, depending on whether or not the tooth slot had been ground to the proper depth. If it was ground short, then the probe will be displaced some distance in the horizontal direction. This displacement of the probe will result in a signal being sent from the LVDT to an amplifier 290, of conventional design, to indicate on an analog meter what the actual tooth slot error is, insofar as spacing goes. There will be a small meter on the amplifier 290 and in the exemplary embodiment contemplated, it will be calibrated in tenths of a thousandth of an inch to visually indicate tooth spacing errors. The signal from the amplifier 290 is sent to another amplifier 292 which will be designed to convert or translate the horizontal displacement of the probe 286 into vertical, as determined by the pressure angle of the tooth slot, which may for example, be in the range of 20, 30 or 40 degrees. In other words, the amplifier 292 will take the trigonometric factor into account, depending on the pressure angle for the given tooth slot size and shape, and convert the horizontal displacement of the probe into a corresponding vertical dimension indicating the vertical error, if any, in the particular tooth slot being measured. This vertical error will relate to the amount of additional vertical feed of the grinding wheel needed to grind the tooth slot to the desired depth. It will be understood from the following description, that during finish grinding operations in the illustrative embodiment of the invention, the error in the tooth slots, if any, will be one of undersized tooth slot rather than oversize. Thus, the corrective feeding motion required will involve additional in feed between the grinding wheel and the workpiece.

The signal from the amplifier 292 is shown as being sent to a digital volt meter 294 which, in the exemplary embodiment thereof, will have a BCD (binary coded decimal) output. This digital volt meter will indicate, in the exemplary arrangement thereof, in tenths of a thousandth of an inch what the actual error is in the vertical direction in the tooth slot being measured, so if there is an error of so many tenths short, a signal will be sent to the Alpha controller in binary coded decimal indicating what correction will be needed in the next feed of the grinding wheel into the workpiece for finish grinding the next tooth slot. In other words, if there was an error, for example, of three tenths of a thousandth of an inch short in the tooth slot being measured, there would be a signal going across on the BCD wires to the Alpha controller indicating three tenths. The Alpha controller would then add these three tenths to the next feed demand for the feeding of the grinding wheel, so that the next time the grinding wheel is fed into the work, it would be fed in whatever the regular control feed was plus the three tenths indicated as the error in the previously finish-cut tooth slot.

In the exemplary arrangement, the amplifier 290 receives a relatively small signal from the LVDT 288 and transforms it into a usable voltage signal, as will be understood. Additionally, it is used to excite the coil of the LVDT. On this amplifier 290, there may be provided a zero adjusting knob with a potentiometer so that the mechanical positioning of the probe to zero does not have to be completely precise. It can be done within, for example, a few thousandths of an inch and then by use of the electrical adjusting knob, further precise adjustment to a zero position may be effected. On the rear of this amplifier 290, there may be provided an output for either a recorder or a printer (not shown) so that if desired, a chart may be made to keep a permanent record of the actual tooth spacing in the particular workpiece being operated upon, and this chart can be obtained at the same time that the in-process gauge readings are being taken.

In designing and selecting the digital volt meter 294, in combination with the other electrical components in this gauging system, it may be set up so that whatever voltage is put into this volt meter, for example, 0.0001 volts, could represent one ten thousandth of an inch in the teeth of the workpiece.

HYDRAULIC SYSTEM

Figure 21:
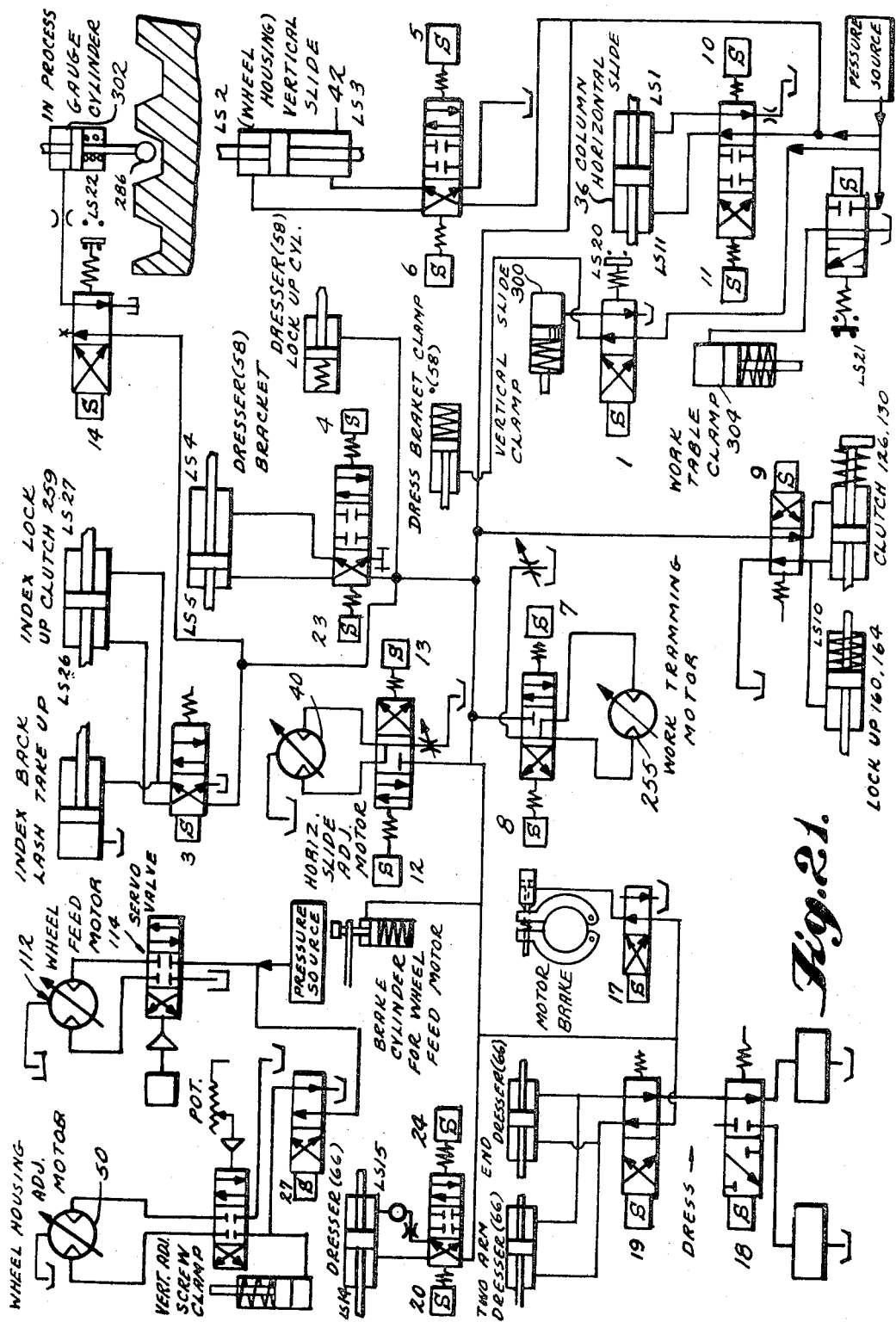
FIG. 21 is a diagram constituting an exemplary hydraulic circuit arrangement for operation of certain parts in the machine.

An exemplary hydraulic circuit arrangement is shown in FIG. 21 as being provided for interconnecting various parts of the machine designed to be hydraulically actuated, such parts including: the column horizontal slide 24; the wheel housing vertical slide 26; the rotary dresser assembly 58; the single point dresser assembly 66; the wheel feed motor 112; the wheel housing vertical slide adjusting motor 50; the column horizontal slide adjusting motor 40; the work tramming motor 255; the index lock-up clutch 259; the lock-up 160 for the cam 150; the clutch 126; the vertical slide clamp 300; the in-process gauge cylinder 302; the work table clamp 304. The clamps for various machine parts may be of conventional design, and additional clamps may be similarly provided for other parts of the machine (not shown) and connected into the hydraulic circuit for actuation, as will be understood.

The flow of pressurized fluid through the lines shown in FIG. 21 and to the various machine parts operated thereby is illustrated as being under the control of electrically actuated valves of conventional design, and in the illustrative arrangement of FIG. 21, solenoids identified by the letter "S" and a number in a circle are shown as being operatively connected to the valves and constructed to be moved between various positions to effect the desired flow of pressurized fluid to the various machine parts, as will be evident. Springs are shown operatively connected to the valves and solenoids to put a spring bias on the valves urging them, for example, to the positions thereof shown in FIG. 21. The solenoids are arranged in the electrical control circuit or system to be operated thereby in the desired timed sequence, as will be understood.

Limit switches, in addition to those mentioned above, may be provided as shown in FIG. 21 for actuation by valves in the hydraulic circuit when they are moved to certain positions, to indicate the completion of certain called-for operations, as will be understood.

An exemplary arrangement of limit switches and solenoids that may be utilized in connection with the electrical and hydraulic control systems and circuitry is given below:

LIMIT SWITCHES

| Number | Description |
|---|---|
| LS 1 | Horizontal Slide — "in" — (Cyl) |
| LS 2 | Vertical Slide — "Up" — (Cyl) |
| LS 3 | Vertical Slide — "Down" — (Cyl) |
| LS 4 | Dresser (Rotary 58) — "Down" — (Cyl) |
| LS 5 | Dresser (Rotary 58) — "Up" — (Cyl) |
| LS 6 | Feed Quill — "Up" Position |
| LS 7 | Index — "Complete" |
| LS 8 | Index Wedge — "Withdraw" |
| LS 9 | Cam 150 — "Stop" |
| LS 10 | Lock Up 156, 160 "Out" |
| LS 11 | Horizontal Slide — "Out" |
| LS 12 | Dresser (Single Point 66) — "Dress" — (Cyl) |
| LS 13 | Dresser (Single Point 66) — "Down" — (Cyl) |
| LS 14 | Dresser (Single Point 66) — "Up" — (Cyl) |
| LS 19 | Feed Quill — "Withdraw" |
| LS 20 | Vertical Slide Clamp — "Unclamp" — (Cyl) — (Solenoid No. 1) |
| LS 21 | Work Table Clamp — "Unclamp" — (Cyl) — (Solenoid No. 2) |
| LS 22 | In-Process Gauge (Probe) — (Solenoid No. 14) |
| LS 23 | In-Process Gauge Bracket — (Solenoid No. 15) |
| LS 24 | Feed Quill — (New Wheel Position) |
| LS 25 | Feed Quill — (Used Wheel Position) |
| LS 26 | Index Lock Up Clutch 298 — "In" |
| LS 27 | Index Lock Up Clutch 298 — "Out" |
| LS 28 | Index Wedge — "Advance" |

SOLENOIDS

| Number | Description |
|---|---|
| 1 | Vertical Slide Clamp — (Single) |
| 2 | Work Table Clamp — (Single) |
| 3 | Index — Lock Up and Backlash Take-Up — (Single) |
| 4 | Dresser Bracket (Rotary 58) — (Double) |
| 5 | Vertical Slide (Cylinder) — (Double) |
| 6 | Vertical Slide (Cylinder) — (Double) |
| 7 | Work Tramming Motor — (Double) |
| 8 | Work Tramming Motor — (Double) |
| 9 | Clutch 126 and Lock Up 156, 160 — (Single) |
| 10 | Horizontal Slide (Cylinder) — (Double) |
| 11 | Horizontal Slide (Cylinder) — (Double) |
| 12 | Horizontal Slide (Motor) — (Double) |
| 13 | Horizontal Slide (Motor) — (Double) |
| 14 | In-Process Gauge — (Single) |
| 15 | In-process Gauge Bracket — (Single) |
| 16 | Shank Tramming — (Double) |
| 17 | Motor Brake (Cylinder) — (Single) |
| 18 | Dresser Speed — (Single Point 66) — (Single) |
| 19 | Dresser Stroke — (Single Point 66) — (Single) |
| 20 | Dresser Bracket — (Single Point 66) — (Double) |
| 23 | Dresser Bracket (Rotary 58) — (Double) |
| 24 | Dresser Bracket (Single Point 66) — (Double) |
| 25 | Shank Tramming — (Double) |
| 27 | Vertical Slide Adjustment Blocking Valve — (Single) |
| 29 | Coolant Shut Off Valve |

The operation of these switches and solenoids and the valves in the hydraulic circuit shown in FIG. 21 will become more apparent in the following description of an exemplary cycle of machine operation.

FLOW CHARTS

FIGS. 22a – e and 23a – g illustrate exemplary cycles of machine operation for the dressing and rough grinding stage, and for the dressing and float and finish grinding stages, as will be described in the next section entitled "Operation." FIG. 24 provides a legend for explaining the various symbols used in FIGS. 22a – e and 23a – g, as will be evident, and the following tables give an exemplary arrangement of electrical timers, electrical counters, and so-called "M" functions, the latter having reference to information stored on the tape used in the Alpha controller, as will become apparent:

ELECTRICAL TIMERS

| Number | Description |
|---|---|

| | |
|---|---|
| 1 | Delay — Vertical Slide — After Unclamping |
| 2 | Delay — Clamping — Vertical slide — "Down" |
| 3 | Delay — In-Process Gauging |
| 4 | Delay — Probe Advance — When In-Process Gauge Bracket Moves In |
| 5 | Turn Air Off — After In-Process Gauging |
| 6 | Delay — Probe Advance — After coolant Shut Off |
| 7 | Delay — Clamping — Vertical Slide — "Up" |
| 8 | Delay — Release of Wheel Motor Brake |

ELECTRICAL COUNTERS

| Number | Description |
|---|---|
| 1 | Number of Teeth |
| 2 | Number of Turns of Cam 150 |

"M" Functions

| Number | Description |
|---|---|
| M03 | Start Spindle Motor — C. W. |
| M04 | Start Spindle Motor — C.C.W. |
| M05 | Stop Spindle Motor |
| M08 | Coolant On |
| M09 | Coolant Off |
| M15 | Enable Deviation Detector |
| M16 | Inhibit Deviation Detector |
| M20 | Unclamp, Advance Rotary Dresser 58, Clamp |
| M21 | Unclamp, Withdraw Rotary Dresser 58, Clamp |
| M22 | Initiate for Oscillation Cycle — Engage Clutch 126 (Zero Feed Register) |
| M23 | Start Oscillation |
| M24 | Unlock Index, Index, Lock Index |
| M25 | Unclamp, Advance Vertical Slide, Coolant to Wheel, Clamp |
| M26 | Unclamp, Withdraw Vertical Slide, Coolant to Dressers, Clamp |
| M27 | Enable DCDT Stepper Control |
| M28 | Retract Wedge of Corrective Index |
| M29 | Start Dresser Motors — C. W. |
| M36 | Start Dresser Motors — C. C. W. |
| M37 | Stop Dresser Motors |
| M46 | Advance Single Point Dresser 66 |
| M47 | Withdraw Single Point Dresser 66 |
| M48 | Test For Loop Stop (Rough Grind) |
| M52 | Unclamp Table |
| M53 | Clamp Table |
| M54 | Rough Dress (Single Point Dresser 66) |
| M55 | Finish Dress (Single Point Dresser 66) |
| M56 | Swing In-Process-Gauge Bracket In |
| M57 | Swing In-Process-Gauge Bracket Out |
| M58 | Coolant Bypass, Air On, Advance Probe, Air Off |
| M59 | Take Reading and Store, Retract Probe, Coolant to Wheel |
| M60 | Advance Dresser Arms |
| M61 | Reset Dresser Arms |

OPERATION

Rough Grinding Machine Sequence

An exemplary rough grinding stage embodying the invention will now be described, and in this connection, reference will be made to the flow chart illustrated in FIGS. 22a – e, and to other Figures as will be referred to. At the beginning of the cycle, the work will already have been mounted on the work table 30, the wheel housing 26 will be in its fully withdrawn position under action of cylinder 42 and piston 44 and with its axis at its zero position, and the feed quill 76 and index table 30 will also be at their zero positions at this time. Everything is in a state of being clamped up, hydraulic pumps are on, the dresser assemblies 58, 66 are withdrawn and the motors are all off. The Alpha register is set to zero, and all datums are set to zero register. Suitable pushbutton operation may be provided for these functions.

Figure 22A:
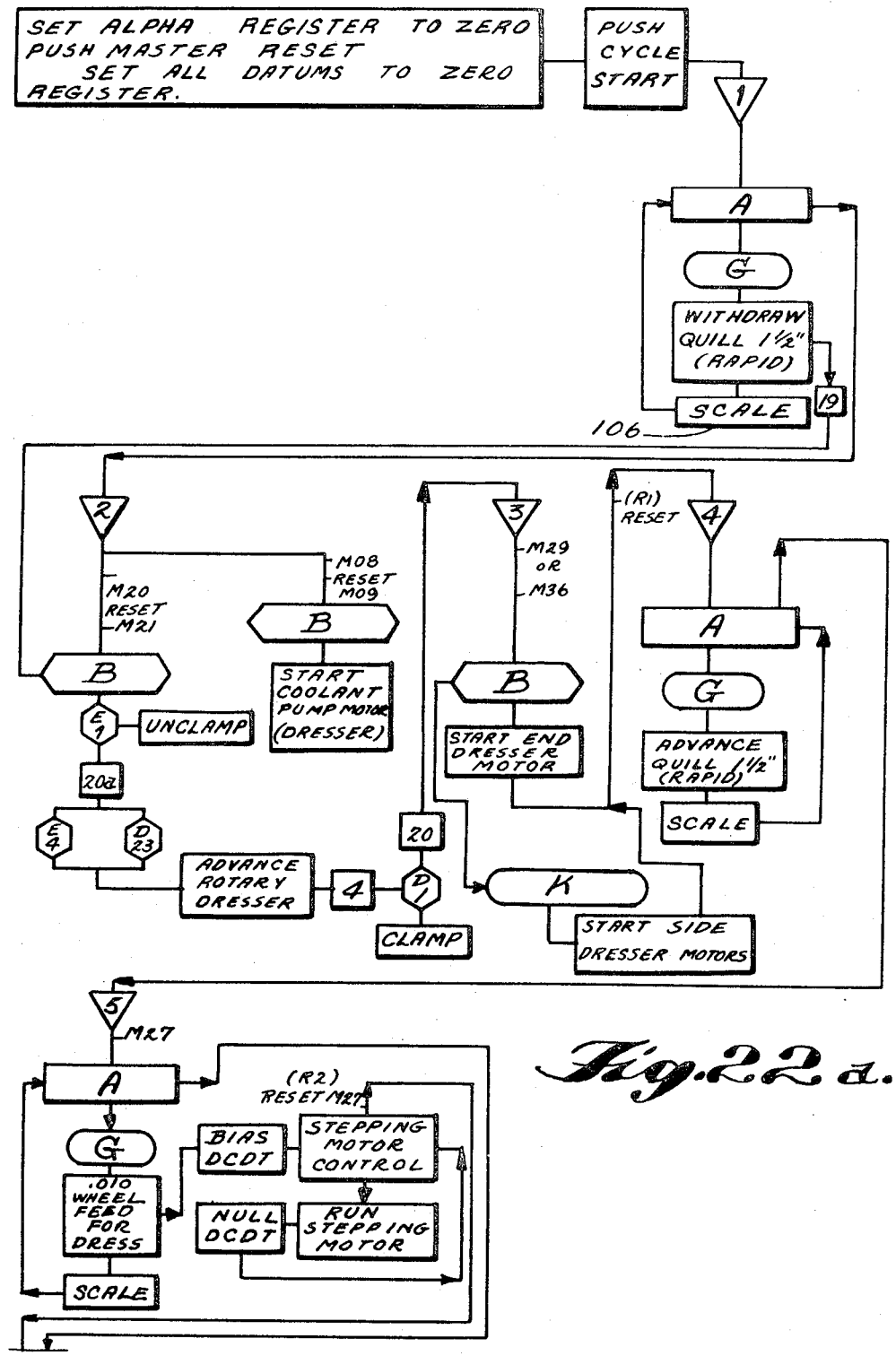
Figure 22B:
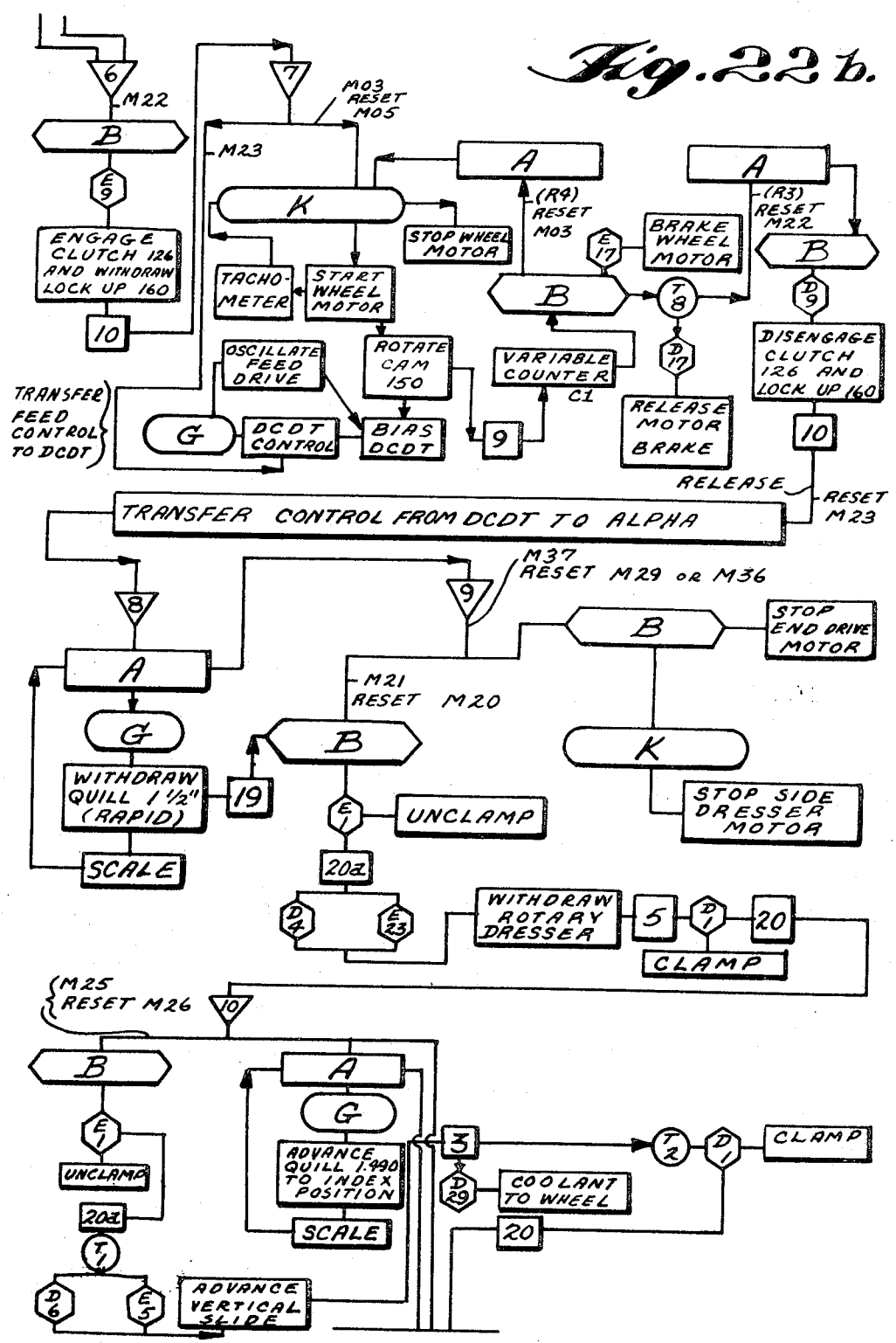
Figure 22C:
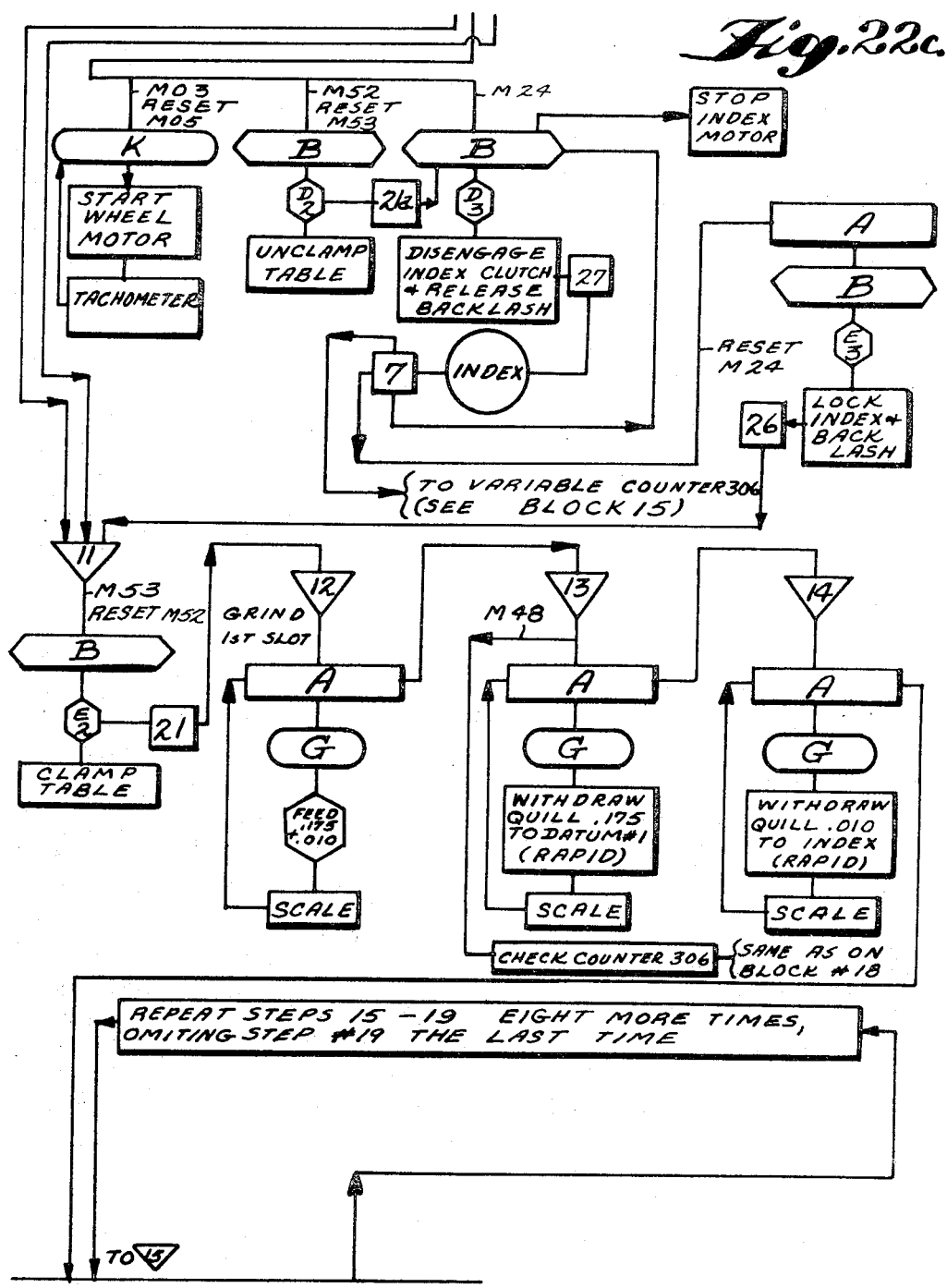
Figure 22D:
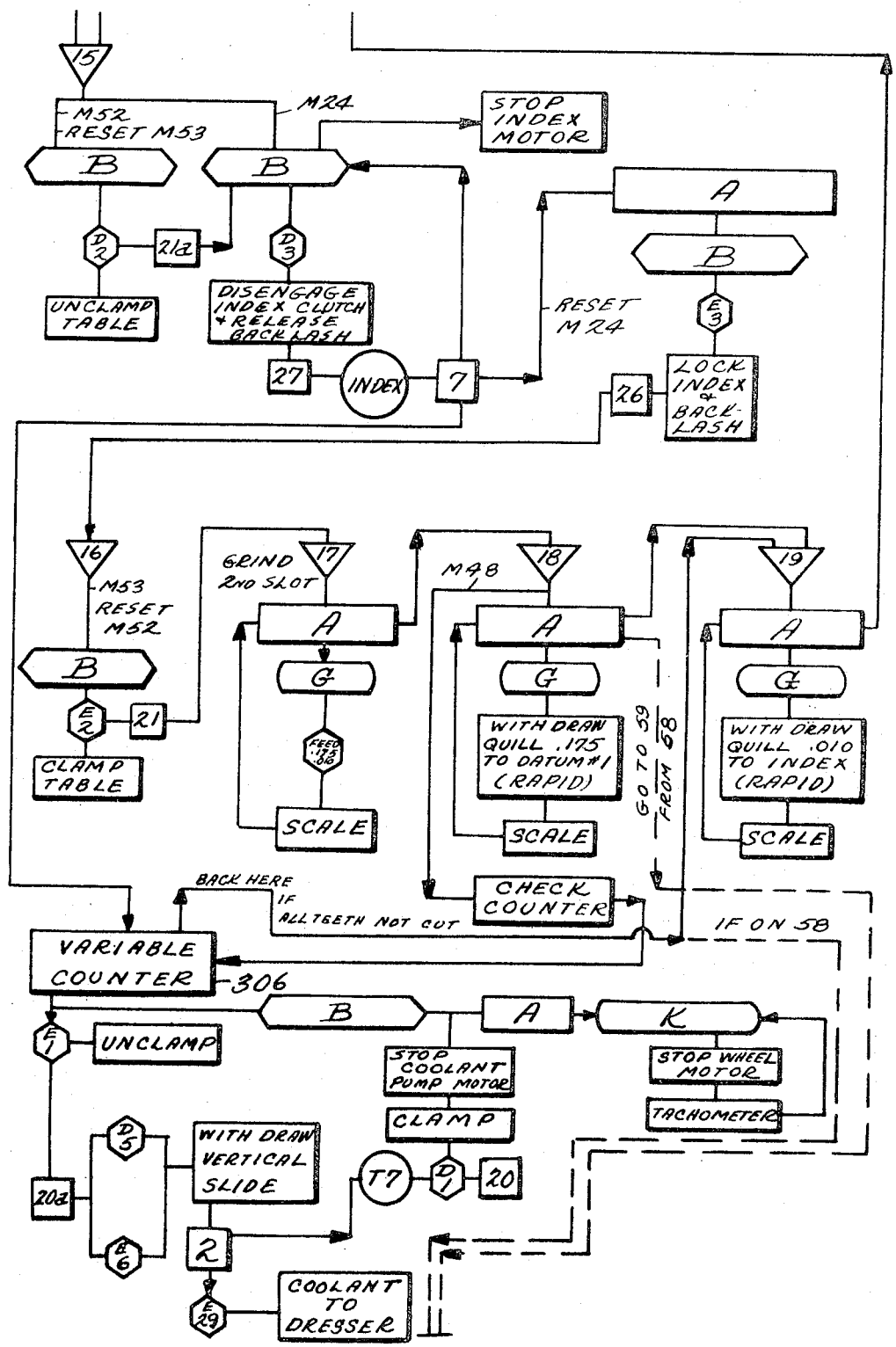
Figure 23A:
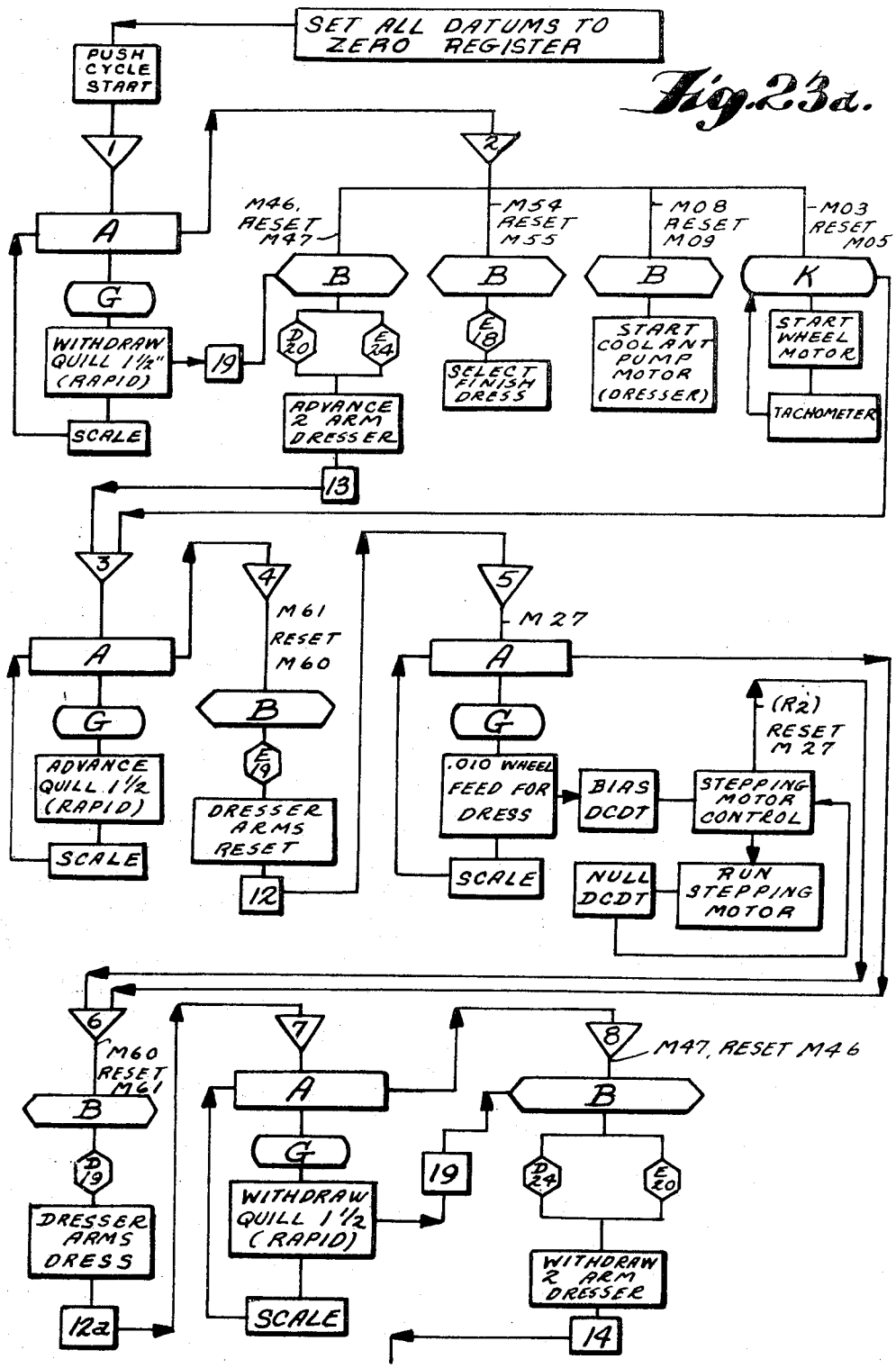
Figure 23B:
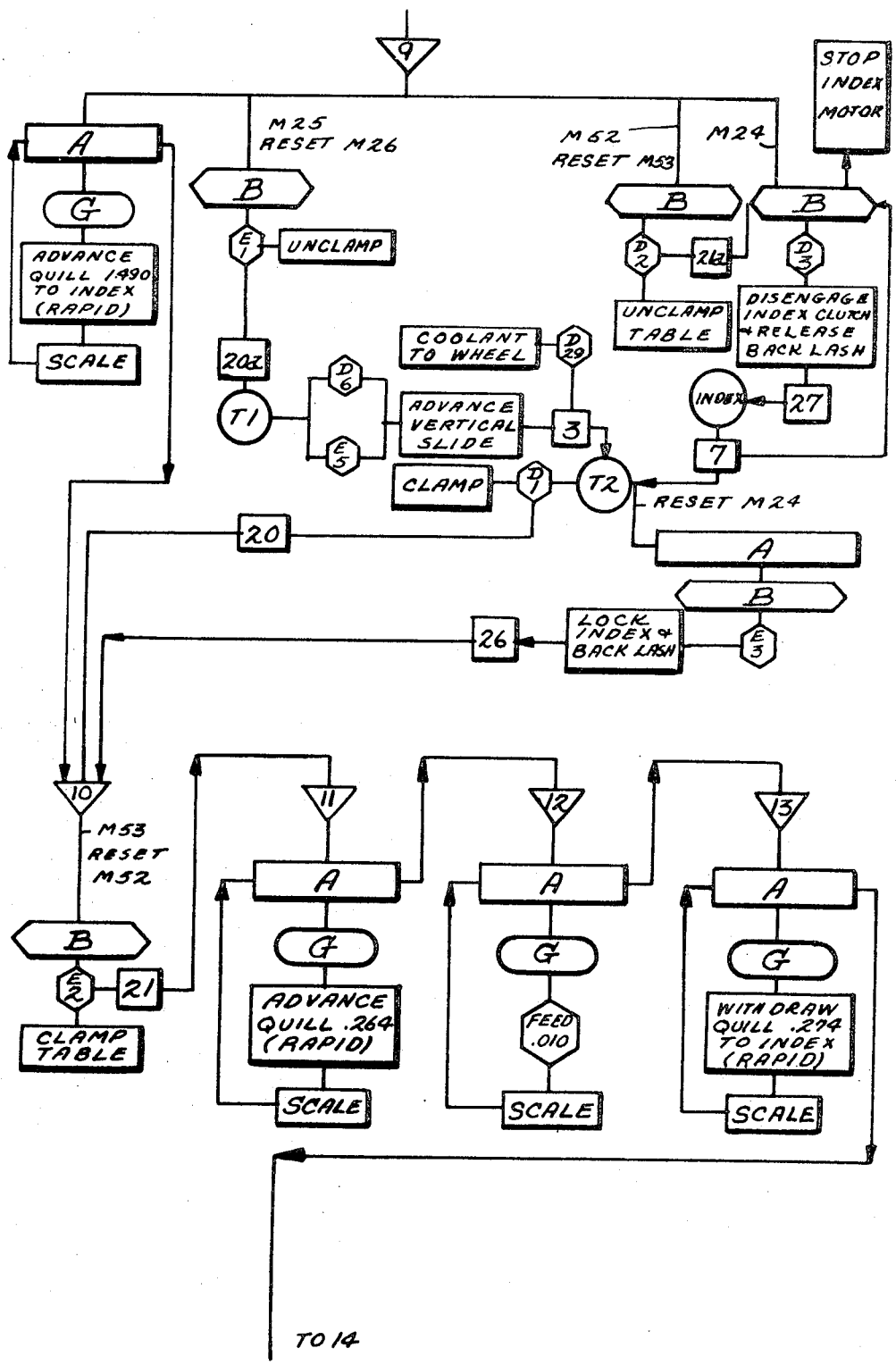
Figure 23D:
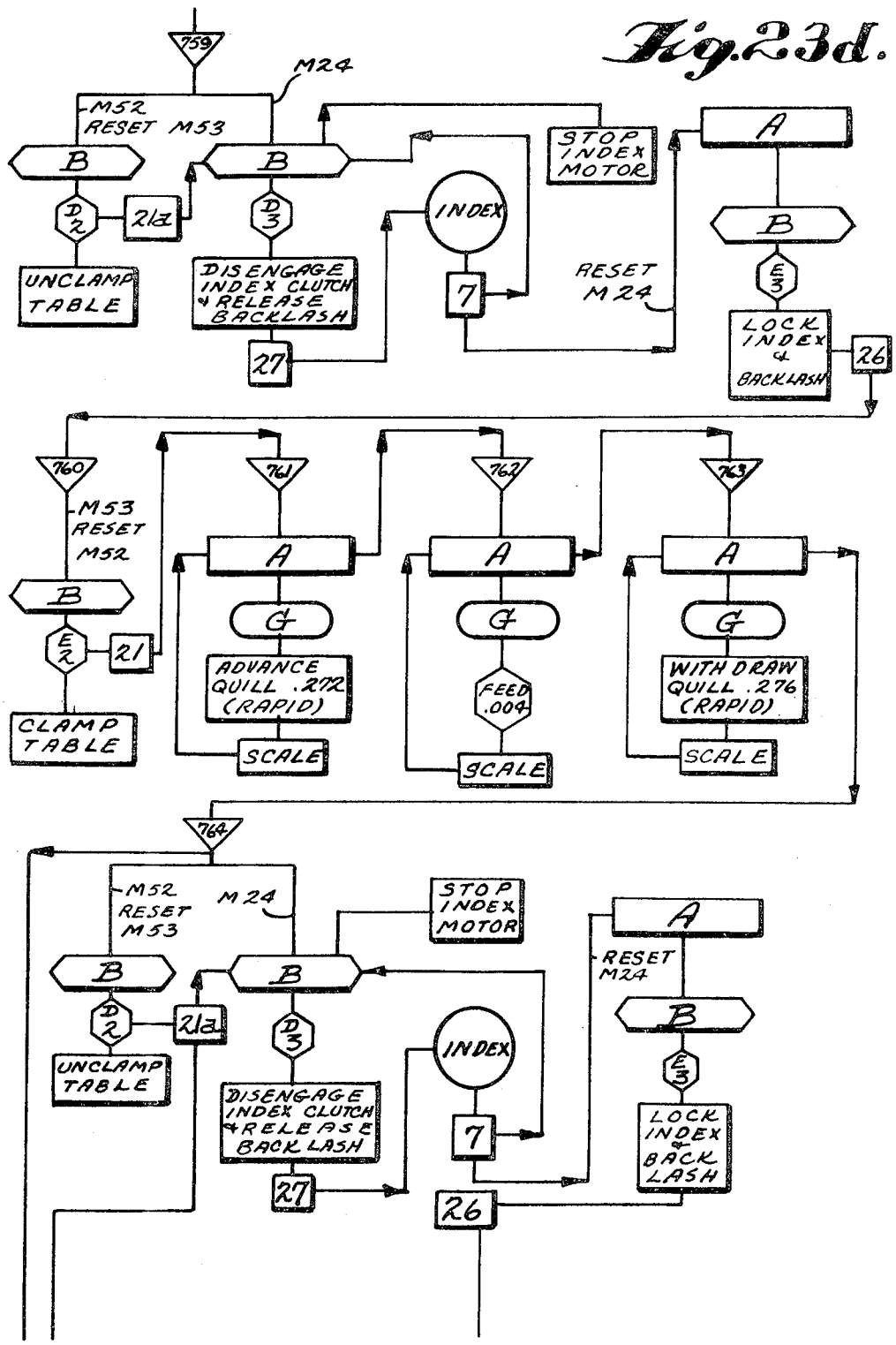
Figure 23E:
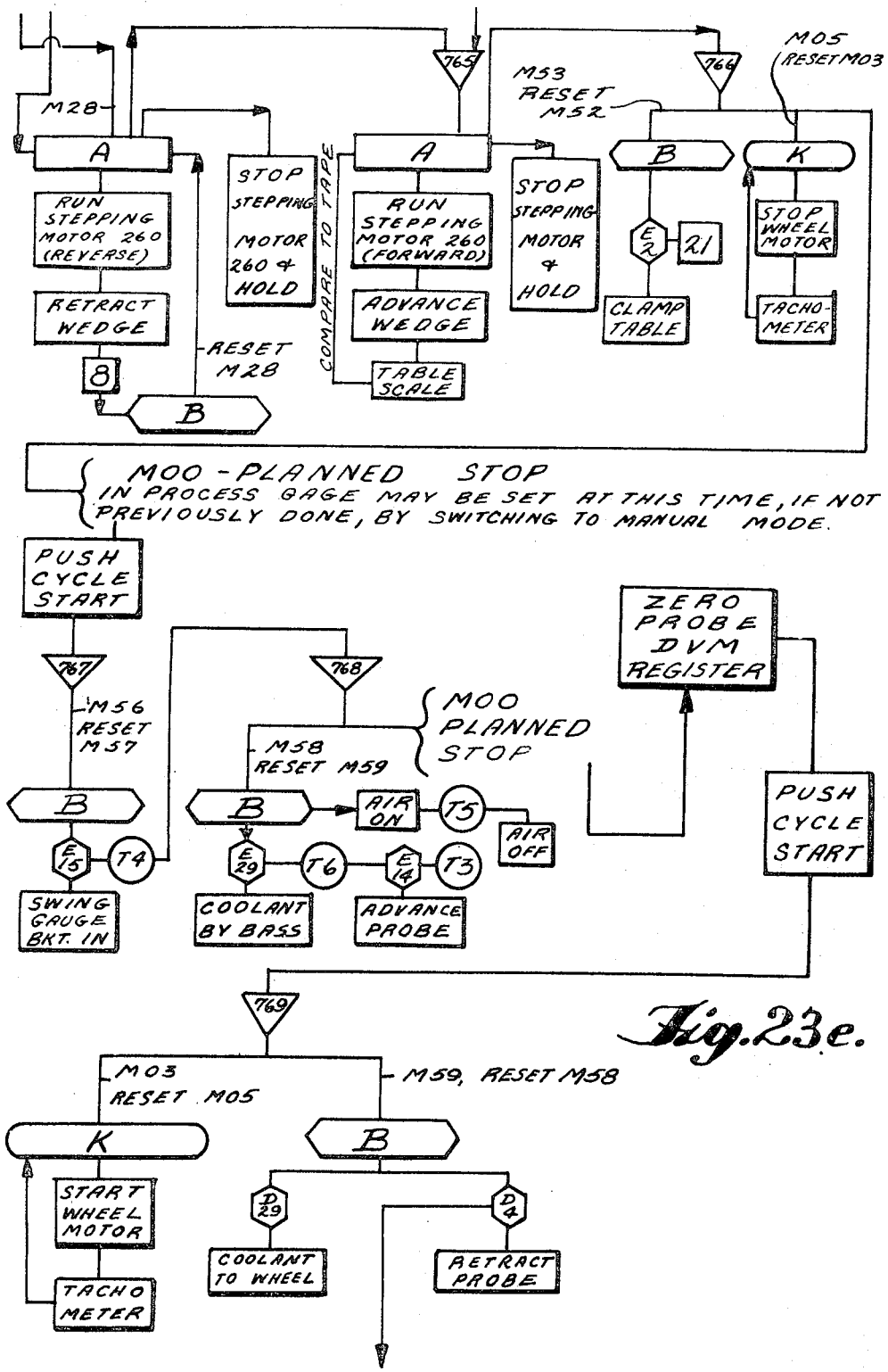
Figure 23F:
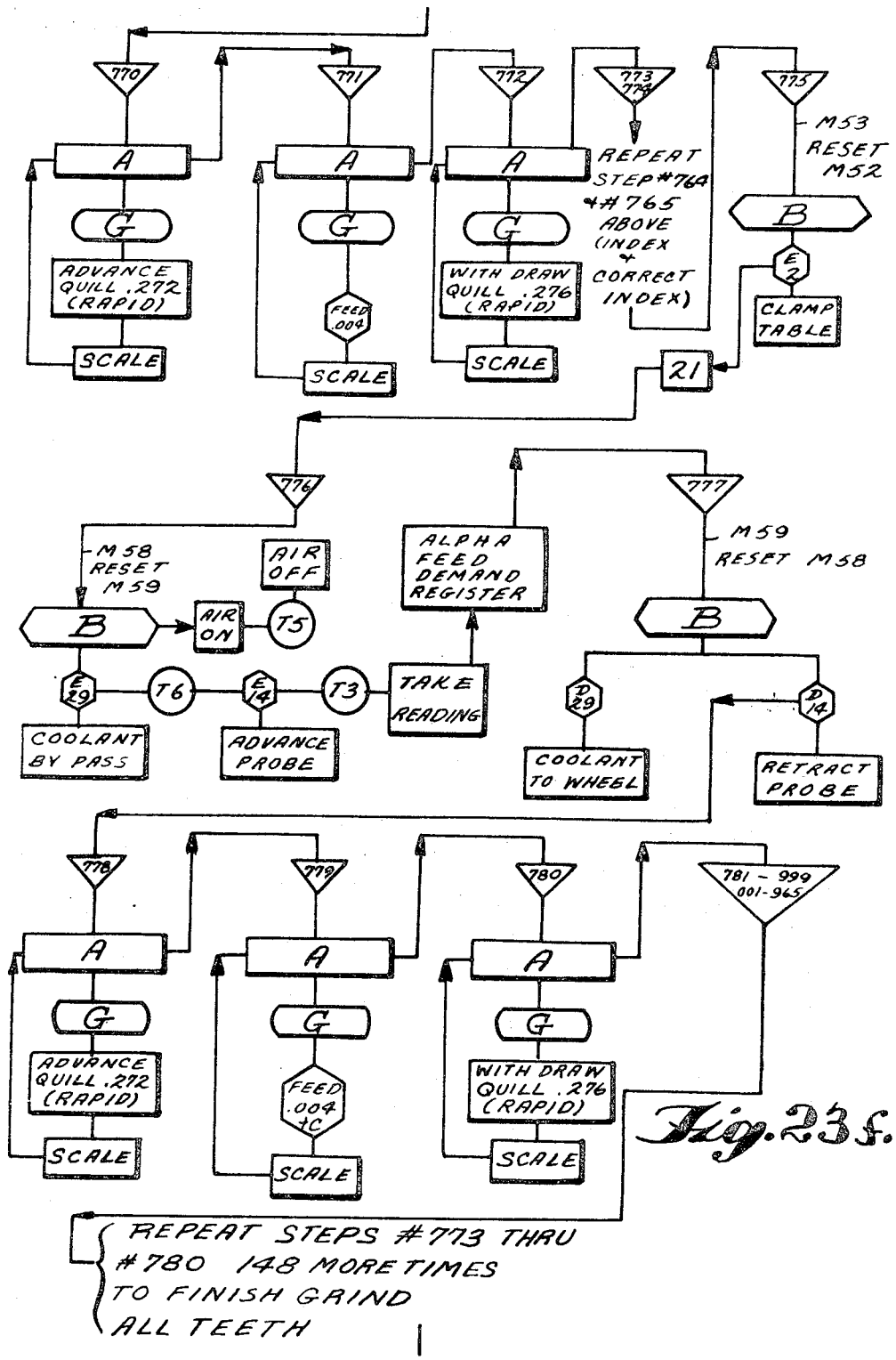
Figure 23G:
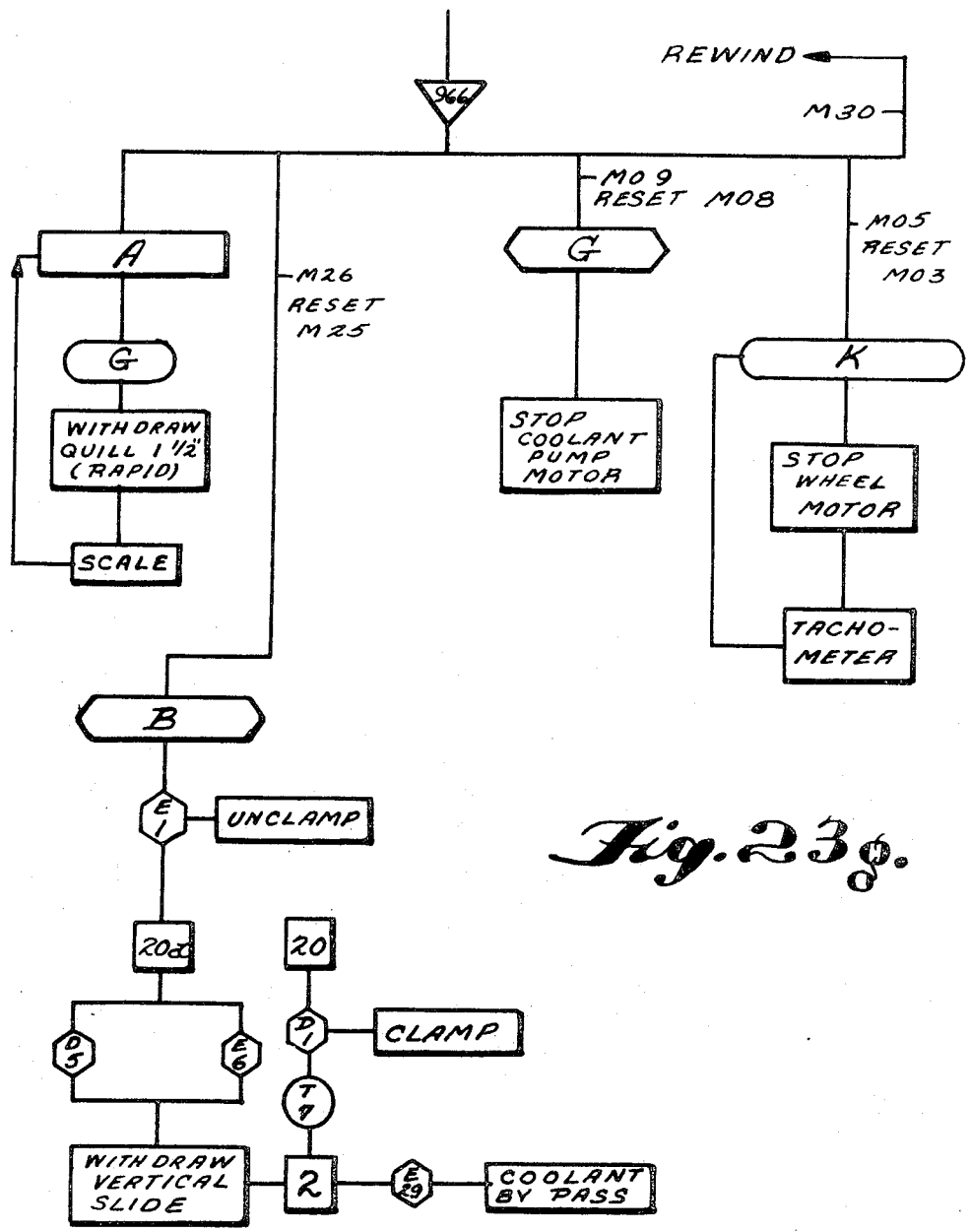

Then the cycle start button will be pushed, and this will now advance the tape in the Alpha controller to block 1 and the instruction there will pass through the Alpha control to the Gamma servo controller to call up a withdrawal of the feed quill of, for example, 1 ½ inches. The feed back from the scale 104 on the feed quill and the reader 106 will indicate when the feed quill has been withdrawn that 1 ½ inches and then the demand register is unloaded and a signal is given to advance the tape to block 2. On block 2 of the tape, two "M" functions are called up, M20 and M08. M08 turns the coolant pump on and M20 calls for unclamping the rotary dresser 58, advancing it, and then clamping it again, as indicated in FIG. 22a. Now, before these latter functions can be executed, LS 19 will have to be contacted. LS 19 should be contacted at the completion of the first block on this tape — the withdrawal of 1 ½ inches. As soon as the feed quill hits LS 19, indicating that it has been withdrawn the 1 ½ inches, this provides the signal to go ahead and execute M20. In other words, at the completion of the 1 ½ inch withdrawal of the quill, the reading of scale 104 is fed back through the Alpha controller as having completed the 1 ½ inch withdrawal, and that in turn moves the tape to the next block position, No. 2, and at the same time the complete withdrawal of the quill of 1 ½ inches will also trip the limit switch LS 19 so that in reading the next block position 2, the Beta Logic is then set up so that it can now operate at that particular block position of the tape.

Thus, in reading the instruction on block 2, it calls for an advance of the dresser 58, but this function cannot be executed unless LS 19 is first tripped. So LS 19 does not actually inhibit the tape reader, it just prevents these functions from being carried out unless it is tripped.

The rotary dresser 58 has now been unclamped and advanced and reclamped. In clamping the dresser another limit switch, LS 20, is tripped and this will advance the tape to block 3. On block 3, we have one of two M functions called up, either M29 or M36 and this will send a signal to our Beta control, the Beta Logic, and then to Kappa. On the rotary dresser 58 we have two separate motors, one which controls the rotation of the side dresser wheels, and another which controls the rotation of the end dresser wheel. The end dresser motor is under Beta control and the side dresser motor is under Kappa control as indicated. So in this instance, on block 3 of the tape we will get a signal to the Beta Logic, and from the Beta Logic we will send a signal to Kappa. The Kappa controller starts the side dresser motor and the end dresser motor will be started at the same time by Beta Logic. Now both dresser motors are turning.

When the end dresser and side dresser motors are started a signal R1 will be generated. The combination of both of these motors running will provide a reset signal, as indicated. M29 will be kept up to keep the dresser motors going. When M29 first came up it stopped the tape, and after it was executed it started the dresser motors. Now we want to reset the flipflop, and we want to leave M29 up so that the tape will move the next block, No. 4, to the tape reader. So we just go in around M29 and reset the flipflop, and now the tape can move to the next block.

That puts us on block 4 of the tape. On block 4, we are within the Alpha control of the feed access, so here again we go from the tape reader and stay within the Alpha control and send a signal to the Gamma amplifier to advance the feed quill 1 ½ inches of rapid traverse. As we are advancing, there is feed back from the scale 104 and reader 106. This will feed back to the Alpha scope controller and when we have unloaded our demand register, when we have come to a home position, we will stop the Gamma motor 112. We lose our signal to the Gamma servo controller, and this will stop the drive where it is. This now puts the feed quill at datum 1. This is our dress position.

When the feed quill arrives at datum 1, Alpha controller will advance the tape to block 5. On block 5, we call up M27. The instruction on M27 will provide a certain amount of wheel feed for dressing and in this instance an exemplary feed of 0.010 inches has been indicated. Here again, we go from the Alpha controller to the Gamma servo controller and this will advance the feed quill 76 the 0.010 inches selected for dressing. Again there is feed back from the reader 106 back through the Alpha controller that indicates when this 0.010 inch advance has been completed and when it has been it will stop the feed at that point. Now, as the feed quill is in the process of moving down this 0.010 inch increment, we are at the same time imposing a bias on the DCDT 174 which is attached to the quill. The core 172 of the DCDT can be considered stationary but the coil of the DCDT travels with the quill so as the quill moves down, the DCDT coil is taken off its null position. And, as this happens, a signal is sent to a stepping motor control and this in turn will run the small stepping motor 182 to move the DCDT coil back to the null position and relative to the feed quill. Thus, we have advanced the quill 0.010 inches and at the same time we have retracted the coil on the DCDT that same 0.010 inches so, in effect, the coil of the DCDT has moved back to the same point it was in at the beginning, namely, its null position While the DCDT operates under block position 5 through the stepping motor, it does not operate under block positions 1 or 4 because, even though the quill is moved in response to these tape positions 1 and 4, the DCDT coil is not energized.

Referring again to block position 5, the quill will now have a new datum. This operates only when feeding into the dresser. At other times it is locked out. The reason for this is because when the wheel is being dressed the quill is moved down some small amount but in effect the end of the wheel stays where it is because it is being dressed off as the quill is fed down. It is necessary to maintain some relationship between the end of the wheel and the zero position on the feed quill, so every time the quill is fed down for dressing we can maintain some zero position for the quill by moving the DCDT coil back that same amount to its null position. This zero position for the quill will be some starting position, called datum No. 1.

The stepping motor has brought the coil of the DCDT back to null and this gives a reset signal to reset M27 and the tape can now be advanced to block 6. In conjunction with this reset signal, the feed back from the Alpha control signals when the quill has been advanced 0.010 inches. So, in effect, it is necessary to advance the quill 0.010 inches and then retract the DCDT coil the same amount to bring it back to null in order to get to block 6 on the tape.

At this time, the dresser motors and wheels are still running, the grinding wheel is not rotating, and what we have done is to feed the non-rotating grinding wheel into the dresser wheels so this has effected the first grooving step for the wheel. We have essentially gone in 0.010 inches without rotating the grinding wheel.

On block 6 of the tape, M22 is called up. M22 will send a signal from Alpha to Beta Logic indicating to engage the clutch 126 and withdraw the cam lock up pin 160.

Referring back to the operation of the DCDT and its being returned to a null position after block position 5 on the tape, it should be noted that the reason for this is to establish a zero position, that is to say, a datum position corresponding to a position of the grinding wheel just in contact with the dresser. So in subsequent dressing operations, after block position 6 on the tape, there will be a position to refer to for movements of the grinding wheel into and away from the dressing wheels.

Referring again to block 6 on the tape, it should be noted that the wheel motor 80 is not running when the clutch 126 is engaged and lock-up pin 160 withdrawn. The clutch is now in and in pulling up the lock-up pin 160 LS 10 is tripped. This permits advance of the tape to present block 7 thereof to the reader. On block 7, M23 is called up and this will transfer control over the feed of the quill from the Alpha controller to the DCDT 174. The Alpha controller will keep track of where the quill actually is, but it will have no control over its movement, which will be under the control of the DCDT 174 at this point, as will be understood.

At this time we also call up M03 which will send the signal from Alpha to the Kappa controller on the wheel motor 80. The wheel motor will then be started at a given RPM and the tachometer feed back for the wheel motor will operate to maintain this RPM. The arrangement of belts and pulleys between the wheel motor and shaft 78 and the tachometer and shaft 78 preferably is such that the tachometer RPM will be the same as the motor RPM.

The wheel motor is now rotating and so is the wheel spindle. Now because the clutch 126 has been previously engaged, the cam 150 is also rotating and there is a synchronized rotary relationship between the wheel spindle and the cam. As this cam rotates, it oscillates the follower 152 and imposes a mechanical oscillation on the core 172. As soon as the core starts to move, the null point for the DCDT coil is lost, and as soon as this happens, there is a signal from the DCDT proportional to the amount of displacement. This signal from the DCDT will go to the Gamma servo controller and in turn run the feed drive to the ball screw 94 and nut 96 to move the quill 76 and DCDT coil 174 to make the coil of the DCDT try to go back to null. In this instance, the coil of the DCDT and the quill are moved together as a unit. Thus, while this arrangement is trying to bring the coil 174 back to null, it involves moving the entire feed quill at the same time. The core 172 is continuously moving in and out of the coil, in response to rotation of cam 150, so the coil is continuously trying to get back to null. Thus, there results the same type of motion on the coil 174 that is imposed on the core 172 and the same motion also results on the feed quill and grinding wheel 28, as will be evident. And this occurs during dressing to put grooves in the cutting surfaces of the grinding wheel.

In summary, and still referring to block 7 on the tape as shown in the flow chart, it will be noted that in starting the wheel motor 80 this causes the cam 150 to rotate through the drive shown in FIGS. 4 and 5. In rotating the cam a bias is imposed on the DCDT through oscillation of core 172. The bias imposed on the DCDT will go through the DCDT controller and from there to the Gamma servo controller and will provide a signal to the servo valve 114 which controls the motion of the motor 112 and feed drive to oscillate quill 76 and grinding wheel 28 in time with the mechanically imposed motion on the follower 152 that is following the cam 150. For each revolution of the cam 150, limit switch LS 9 is tripped and the counter 168 is actuated. This counter may be set ahead of time and it functions to count the number of revolutions that the cam 150 makes. Thus, by setting the counter 168 and selecting appropriate change gears 144, 146, the number of grooves put on the grinding wheel during dressing can be varied, as will be understood.

In other words, the speed of the grinding wheel may be considered fixed, but in going from the wheel spindle to the cam 150 there are the change gears 144, 146. Therefore, by using different change gears the speed of the cam 150 will be varied. In varying the speed of the cam, the number of grooves put on the wheel during dressing for every revolution that the wheel makes will also be varied, as will be evident. And limit switch LS 9 and counter 168 will count the number of revolutions of the cam 150. Thus, if it is desired to put 60 grooves in the grinding wheel and the cam 150 has 10 lobes on it, then the cam will have to make six revolutions for every revolution of the grinding wheel, and if it is desired to dress the wheel 28 in just one pass or one revolution of the wheel, the variable counter 168 will be set at "6" so when the cam 150 has made six revolutions, the counter will signal to stop the wheel motor 80. This signal will go to the Beta Logic, as indicated, and from there it will be used to reset M03 and in resetting M03, we now go through the Alpha controller and from there to the Kappa wheel motor controller and stop the wheel motor. In effect, this is what resetting M03 does. It stops the wheel motor 80 substantially instantaneously.

At the time the counter 168 counts out, a signal is also provided within Beta Logic to apply a suitable external brake to stop the shaft 78 and the wheel motor 80 as soon as limit switch LS 9 is tripped for the last time. We then go from Beta through a timer T8 which will be set, say for a few seconds or so, and after this timer is timed out, the brake that was applied previously to stop shaft 78 and the wheel motor will be released. This same timer, I8, is also providing a reset signal R3 to reset M22. Resetting of M22, which was called up on block 6, enables the clutch 126 to be disengaged and the cam lock up 156 to be engaged by pin 160, or exactly the reverse of what was done on block 6. The reset signal R 3 goes through the Alpha controller and back to the Beta Logic to disengage the clutch 126 and put cam lock up pin 160 in the notch 158 on disc 156. In engaging the cam lock up, there is movement off limit switch LS 10 to lose contact there, and immediately upon breaking contact with LS 10, a signal is provided to reset M23, and in resetting M23 control over the feeding movements of quill 76 and wheel 28 is transferred from the DCDT coil 174 back to the Alpha controller.

We have now completed the first 7 blocks on the tape and we have switched from DCDT control back to Alpha control and the tape will now be moved to block 8. On block 8, there is an instruction within the Alpha control loop. A signal from the Alpha controller will be sent to the Gamma servo controller and this will withdraw the feed quill 76 1 ½ inches at rapid traverse. As the quill is moving back, there is feed back indicating when the home position is reached, as discussed above, through reader 106. This will feed back to the Alpha controller and when home position is reached, Alpha provides the signal to advance the tape to block 9.

On block 9, M37 is called up and this will send the signal to Beta Logic. From Beta a signal will be sent to the Kappa controller to stop the side dresser motors, and simultaneously within Beta Logic, a signal will be provided to stop the end dresser motor, as indicated.

M21 is also called up on block 9, as indicated, and M21 instructs through the Beta Logic to unclamp the rotary dresser 58, withdraw the dresser and reclamp, but here again, as in going from block 1 to block 2, before M21 can be executed, LS 19 will have to be contacted at the completion of the function on block 8. Here again there is an interlock where LS 19 does not inhibit the tape reader. In other words, the tape will move from block 8 to block 9 and read the instructions, but what LS 19 does is to prevent execution of the function unless it has been contacted. Thus, the dresser assembly 58 will not be withdrawn unless the feed quill has been withdrawn, as called for. Actuation of LS 19 indicates that the quill is back the 1 ½ inches and that the dresser assembly may now be withdrawn.

Upon withdrawal and clamping the rotary dresser 58, LS 20 is tripped. LS 20 will advance the tape to block 10. On block 10 there are several instructions, all of which will be executed substantially simultaneously and they will be discussed in the order in which they appear on the flow chart, going from left to right, but bearing in mind that all of these functions are intended to be executed at the same time. M25 is called up, as indicated, and this will send the signal to Beta Logic to unclamp the vertical slide 26, advance the slide (through cylinder 42 and piston 44), and at the end of this advance travel, limit switch LS 3 is tripped and a signal is provided to de-energize solenoid 29 to send coolant to the grinding wheel. Previously the coolant was applied to the dresser. Coolant will now be applied to the wheel. The slide 26 is now all the way down. It is then reclamped and in doing so LS 20 is tripped and that completes the first function here under M25.

The next instruction we have on the tape under block 10 will go from the Alpha controller to the Gamma servo controller and will advance the feed quill 1.490 inches at rapid traverse and this will put the quill and grinding wheel at index position. Index position in this exemplary arrangement being 0.010 inches above the top of the blank or workpiece. In feeding the quill 76 down again, there is position feed back from reader 106 to the Alpha controller to provide the signal to stop feeding when the demand position is reached.

The next instruction on block 10 of the tape calls up M03. M03 will provide a signal to the Kappa wheel motor controller to start the grinding wheel 28 at some selected wheel speed. The speed will be part of the tape program and here again, there will be tachometer feed back to maintain the grinding wheel speed.

The next two instructions on block 10 are interrelated, calling up two "M" functions, M52 and M24. M52 provides a signal to Beta Logic to unclamp the work table 30. M24 provides a signal to Beta Logic to disengage the index clutch which, in effect, frees the index drive and at the same time also releases the pressure to the backlash piston for worm 242, so now the index drive is completely free for indexing. (See the U.S. Pat. No. 3,572,175, referred to above, for a more detailed description of the index clutch and index drive.) These two "M" functions, M52 and M24, are interlocked such that M24 cannot be executed until M52 is completed. In other words, the index clutch cannot be released unless the table clamps have been first released just to make sure that there is no danger of indexing without first releasing the table clamps. This is done with limit switch LS 21a, which indicates that the table clamps have been released.

In disengaging the index clutch and releasing the backlash, limit switch, LS 27 is tripped. This limit switch permits starting of the mechanical index motor 244. As soon as the index motor is started, contact is lost with limit switch, LS 7. The index motor will continue to run until shaft 274 carrying gear segment 272 has made one complete revolution and projection 270 again trips LS 7. As soon as LS 7 is tripped, indicating the completion of an indexing step, three functions are performed simultaneously. First, a signal is sent to a variable counter 306 which is used to count the number of teeth in the blank. This counter will be preset to the number of teeth desired. LS 7 also provides a signal to stop the index motor 244. This is done immediately on contact with LS 7, and that signal is fed back into the Beta controller which in turn stops the index motor. Actually all this is within Beta Logic, but the way it is shown, the signal from LS 7 goes back to Beta Logic to stop the motor. In effect, it never gets out of Beta control. Everything is within Beta control at this point. Also on contact with LS 7, a signal is provided to reset M24. M24 is actually what started the index cycle so at this time it is necessary to reset that "M" function.

In resetting M24 it is necessary to go through the Alpha controller again. Alpha will send the signal back to Beta Logic and the index will be locked, that is, the index clutch will be engaged and at the same time pressure will be applied to the anti-backlash piston for worm 242. The index drive is now locked up again. In locking the index clutch, LS 26 is tripped and this was the last instruction on block 10 of the tape.

In order to get to block 11 on the tape, three things are necessary. First of all, the feed quill must have advanced to the proper position, that is its index position, and the demand register on the feed axis must have gone to zero, in other words, to indicate arrival at the proper position. The second thing necessary is that the vertical slide or wheel housing 26 has come down its full travel and has been clamped, so that LS 20 on the vertical slide clamp provides a second signal necessary to advance the tape. When the vertical slide is fully downwardly advanced, Ls 3 will be tripped enabling the vertical slide to be clamped. The third signal needed to advance the tape to block 11 is a signal from LS 26 on the index lock-up clutch to indicate that the index has been locked.

On block 11, M53 is called up. This sends a signal to Beta Logic to clamp the work table. In clamping the table, LS 21 is tripped. LS 21 will advance the tape to block 12. On block 12 there is an instruction on the loop tape to grind the first tooth. There is a signal from Alpha to Gamma servo controller and this will advance the feed quill at some preselected or some programmed feed rate to a certain depth, for example, a depth of 0.185 inches from index position. Of this travel, 0.010 inches represents the clearance above the top of the blank and 0.175 inches will be the actual grinding depth from the top of the blank to the bottom of the slot.

In feeding down, there again is position feed back from the reader 106 back to the Alpha control and this will stop the feed when the demand position is reached, that is, when the wheel 28 has been fed down 0.185 inches. At this time, Alpha provides a signal to advance the tape to block 13. On block 13, there again is a signal to go from Alpha to the Gamma servo controller and to withdraw the quill 0.175 inches at rapid feed rate and again there is position feed back to indicate arrival at the demand position.

Referring back to block 12, at that time the feed quill was advanced a total of 0.185 inches. On block 13 it is withdrawn only 0.175 inches. So, in effect, the end of the wheel is right at the top of the blank. It is at datum 1. On block 14, there is movement through the same control loop and the quill is withdrawn the additional 0.010 inches to bring it back up a total of 0.185 inches to the position thereof prior to execution of block 12. The reason for so splitting up the withdrawal of the feed quill is as follows. At the end of a rough grinding pass, in other words, after the desired number of teeth have been ground in one complete revolution of the blank, every tooth has been ground and the last tooth may fall anywhere within this loop tape, depending on the number of teeth to be cut. That is to say, it may not fall right at the end of the tape. If the last tooth happens to fall somewhere between the start and end of the loop tape, there will have to be some way of stopping the machine, the machine slides, and the quill in the proper position to be set up for the next cycle or next pass. The proper position for the quill is at datum 1, at the top of the blank, as will be understood. Now, going back to blocks 13 and 14, after block 13 has been executed, the wheel is at the top of the blank and therefore at datum 1. This would be the proper position for stopping, at the end of the cycle, if that happened to fall somewhere in the middle of the loop tape; but in the normal course of a grind, in order to index to the next tooth, there has to be some clearance between the wheel and the top of the work, as will be understood, and block 14 will provide that clearance. Block 14 will take the wheel up an additional 0.010 inches.

Thus, after completing block 13, the quill is in proper position to go back to block 1 on the tape, if the counter 306 counts out. In this connection, it will be noted that M48 is called up by block position 13, and this "M" function will effect a reading of the counter 306 to determine whether or not the loop tape should be stopped, at this point. It will be understood that the loop tape may make several complete passes through the tape reader for one pass or revolution of the workpiece, depending on the number of teeth to be ground, as indicated by setting counter 306. Thus, it is possible that the counter may count out at block 13, after several passes of the tape.

Referring again to the movement of the tape through the reader, block 14 has left the machine at index position and the tape moves to block 15. On block 15 a portion of block 10 is repeated, namely M52 and M24. The sequence here will be identical to block 10 for these "M" functions, as will be apparent. The functions relate to indexing the work so as to position it to have the next tooth slot cut.

On block 15, after completing an index, LS 26 will be tripped to advance the tape to block 16. On 16, M53 is called up to clamp the work table. In clamping the table, LS 21 is tripped to advance the tape to block 17. On block 17, the feed is started for the second tooth slot (on the tape), and this will be the second slot ground. Again, there is movement from Alpha to the Gamma servo controller to feed the quill down to some programmed depth again, in this example, a total of 0.185 inches, and feed back from reader 106 to the Alpha control will stop the quill in the proper position at the proper depth. A signal from Alpha will advance the tape to block 18 and on block 18 we again go through the same loop, Alpha to the Gamma servo controller and now the quill is withdrawn 0.175 inches at rapid feed rate, and again there is position feed back, and this portion of block 18 will be seen to be the same as block 13. The quill is now back to datum 1, but it has not yet been brought back to index position.

As indicated, block 18 on the tape calls for functions corresponding exactly to block position 13 on the tape. However, for convenience of illustration, on the flow chart under block position 13 for the tape, there is omitted the line going from the check counter box to the variable counter 306, etc. as indicated under block position 18 for the tape. It will be understood that such connections will also be provided from the check counter under lock 13 in the event the tape stops at that point for the setting of counter 306.

On block 18 then, as well as on block 13, M48 is called up. M48 calls for the Alpha controller to check the counter 306 on the index. This is the counter set up for the number of teeth to be cut, and it refers back to block 15 on the flow chart, as indicated. The counter was tripped back on block 15, but it is not read until block 18 comes up. At this point, only the second tooth slot has ben ground, and the tape moves to block 19 which corresponds to block 14, as is evident.

The way this exemplary oop tape will be set up will be to punch holes in it corresponding to the nineteen block positions, just discussed and then to cut further positions on the tape corresponding to block positions 15 through 19, and then repeating those block positions 15–19 by further perforations on the tape until there is provision on the tape for cutting a certain number of teeth, fore example, 10. The final two positions on the loop tape will be blocks 59 and 60. The tape will move continually in a forward direction through the tape reader until ten teeth are cut, and then blocks 59 and 60 will be called up and the tape will then be moved back to block 1 to begin additional passes thereof through the reader until the desired number of teeth are cut. The counter 306 will be checked at block positions 13, 18, 23, 28, 33, 38, 43, 48, 53, 58 on the tape so that the tape will be stopped in the manner indicated below block 18, which will be the same regardless of which block position the counter counts out on.

Let it be assumed that at a position corresponding to block 18 (e.g. 23 or 58) the counter 306 indicates the desired number of teeth have been cut. So it will be assumed that the loop tape has passed several times through the reader in Alpha, and the last tooth slot called for by counter 306 has been ground just prior to withdrawal as called for by the block corresponding to block 18.

Since the last tooth slot has been ground, we want to stop the cycle, we want to come out of the cycle and leave all the slides, etc. in the proper position. Block 18 has brought the wheel 28 out of the tooth slot and returned it to datum 1, right at the top of the blank. At this point, the counter 306 has counted out, indicating that all the teeth on the blank have been cut, and at this point rather than advancing the tape to the next block, the tape and tape reader will be inhibited and the following functions, which complete the cycle, will be carried out entirely within Beta Logic and they are done outside of the loop tape. These functions are not programmed on the tape and what does take place when the counter counts out is that first the vertical slide is unclamped, then it is withdrawn the full amount until switch LS 2 is tripped. This will shut off flow of coolant to the grinding wheel and apply coolant to the dresser. This may be done with a solenoid actuated valve directing the flow of the coolant, as will be understood. Also, when the slide reaches its maximum "up" position, the slide is again clamped, and a signal is sent from Beta Logic through Alpha to reset MO3 and send a signal to the Kappa wheel motor controller to stop the wheel motor 80. Then the coolant pump motor is stopped. At this point the machine is ready to go into the next cycle. A new tape may be selected and inserted into the Alpha controller. The machine is in starting position. It is only necessary to zero the registers, push the master reset, set all datums to zero, register and push the cycle start button.

Referring back to block 18, or to any block on the loop tape corresponding to this block, if the counter 306 has not counted out at the time that block comes up and there are still more teeth to be cut, the tape will advance to the next block on the tape (e.g. block 19, or to a block corresponding to block 19). On this block, say it is block 19, the quill will be withdrawn the additional 0.010 inches back to index position. There will again be position feed back from scale reader 106 and when the quill is withdrawn the tape will advance to block 20. Block 20 does not appear as such on the flow chart, but the instruction on block 20 will be identical to the instruction which was found back on block 15, block 21 will be identical to block 16, block 22 will be identical to block 17, block 23 to block 18, block 24 to block 19, block 25 to block 15 and so on. Thus, the tape will progress from block 18 to block 19 to block 20 to 21 to 22, etc., but for the purposes of convenience in illustrating the flow chart, blocks 20 and following are not shown, and the five blocks 15–19 are repeated over and over until the desired number of block positions has been produced. In the exemplary arrangement shown, these five blocks are repeated eight times on the loop tape, thus constituting a 10 tooth tape. This is the last tooth that is programmed on the tape and the block corresponding to the 10 tooth will be block 58. This is near the end of the tape, and at this point the counter 306 is again checked in the manner indicated under block 18, and assuming it does not count out, the tape advances to block 59 as shown on the flow chart. Thus, from block 58 (corresponding to block 18 on the tape) the tape will advance directly to block 59 as indicated in dashed lines on the flow chart. Block 59 does not correspond to block 19, as will be evident.

On 59 M26 is called up. This is a signal to the Beta Logic to unclamp the vertical slide and withdraw it the full amount. At the top of the travel of the slide, limit switch LS 2 will be tripped to switch the flow of coolant from the grinding wheel to the dresser. This is done through solenoid 29, as indicated. Also, at the time limit switch 2 is tripped at the upper end of the travel of slide 26, the vertical slide clamps are applied. In clamping the slide, limit switch, LS 20 is tripped to advance the tape to block 60. Block 60 is the last instruction on the exemplary loop tape under consideration. On this block, M09 is called up and instructs the Beta Logic to stop the coolant pump motor and also on this block M05 is called up. M05 provides a signal from Alpha to the Kappa controller to stop the wheel motor. At this point, the end of the loop tape has been reached and the tape advances to block 1 so that the machine may be set up for another dressing cycle and the entire loop will be repeated, as will be understood, until the desired number of teeth have been rough ground in the workpiece.

Float Grind and Finish Grind Machine Sequence

After the rough grinding operations have been completed on the workpiece, it is contemplated in the present invention that the grinding wheel be dressed and the workpiece subjected to a float grinding operation followed by a finish grinding operation. An exemplary sequence for these operations is indicated in the flow chart shown in FIGS. 23a –g. A different tape will now be used in the Alpha controller to initiate the dressing and float grinding and finish grinding operations, and this tape will be provided with the desired information thereon to effect the desired sequence of operations. In an exemplary arrangement, this tape involves two passes around the workpiece wherein each tooth slot is ground twice. The first pass around the workpiece involves float grinding and the second pass is the finish grinding stage.

By "float" grind is meant a grind with basically no infeed. In the course of rough grinding there will be some variation in the tooth proportions and in the depth of the teeth, as will be understood. One of the purposes of the float grind is to make the teeth (or tooth slots) more uniform. Therefore, on the float grind pass, the grinding wheel will be freshly dressed to give a true profile and the wheel would be fed to the same depth as on the last rough grind pass. Thus, during float grinding the tooth slots are being trued and only a small amount of metal is removed in an effort to make all the teeth more uniform in shape and depth.

Another purpose of the float grind is to condition the grinding wheel. Before float grinding, the wheel will be dressed, and there will be some loose wheel particles at the surface of the wheel and some sharply dressed grains. Consequently, the wheel will be sharp. As the float grinding takes place the wheel will be conditioned in the sense that its cutting surfaces will be gradually dulled to an extent wherein there will be minimal wheel breakdown, almost an unnoticeable amount. Therefore, in float grinding, the wheel is dulled or conditioned so that after one complete pass is made around the workpiece, the finish grinding operation may be started and the wheel will have a uniform cutting surface on it.

For this particular cycle, as shown in FIGS. 23a – g the single point dresser assembly 66 may be used for dressing, although, as indicated above, the rotary dresser 58 may be used, if desired. For the first pass on this tape, the float grind pass, as in the case of the rough grinding cycle, there will be no precision corrective indexing using the motor 260, as presently contemplated in the exemplary embodiment. The table will be mechanically indexed by motor 244 as during the rough grinding stage. During finish grinding, however, there will be precision corrective indexing in combination with mechanical indexing, as will be explained.

It might be noted at this point that between the loop tape for roughing, described above, and the tape for float and finish grinding, one or more intermediate tapes may be utilized, and following the same format as either the roughing loop tape or the float and finish grind tape, as will be understood, since it may not be possible to rough grind to full depth in one pass using only one roughing tape. For example, if the finished tooth slot is to be 0.266 inches deep, the first loop tape could involve a feed depth of 0.175 inches. Additional feed depth could be achieved with an intermediate roughing tape or tapes, leaving some small additional feed depth for the finish grind, if desired, as will be understood.

Referring again to the start of the float and finish grinding cycle, it is necessary to zero the register and set all datums to zero. It is contemplated that all machine parts and all machine slides preferably area always in the same starting position, whether we start a float or finish grind cycle, or rough grind cycle; and at the start, the wheel housing or vertical slide 26 is withdrawn the full amount for dressing the wheel. When the cycle start button is pushed, it results in a reading of the first block on the tape.

On block 1 there is an instruction passing through the Alpha and Gamma controls to withdraw the feed quill 1 ½ inches, with position feed back, as discussed above, to indicate when the quill has been withdrawn that amount and then the tape is advanced to block 2.

On block 2 there are four functions that are initiated simultaneously. First, M46 is called up to advance the dresser 66. This is accomplished through Beta Logic and in order to advance, the dresser limit switch LS 19 must be tripped at the completion of block 1 of the tape, as discussed above. Here again, it is interlocked so that the tape is not inhibited from going to block 2, but the execution of M46 is prevented unless LS 19 had first been tripped indicating the completion of the called for withdrawal of the quill. The dresser 66 is advanced and it trips limit switch LS 13. This completes the first function on this block of tape through M46. Next, M54 is called up and acts through Beta Logic to select the desired rate of the dresser arm speed across the surface of the wheel. Also on this same block 2 of the tape M08 is called up. This starts the coolant pump motor and provides coolant to the dresser. The last function on block 2 is to call up M03. Here a signal is sent from Alpha to Kappa to start the wheel motor 80 at some selected speed.

Everything is now completed on block 2 and there are two signals indicating tape advance. One signal comes from the Kappa wheel motor controller and it indicates that the wheel has started and is running at a selected speed (with tachometer control as indicated and as discussed above). The second signal comes from the limit switch on the dresser assembly 66 indicating that the dresser has come to the "in" position, that is, the dress position. Both these signals will operate together to advance the tape to block 3.

On block 3 there is an instruction through Alpha to advance the quill rapidly 1 ½ inches. This puts the quill at datum 1, and then the tape is advanced to block 4 where M61 is called up. M61 provides an instruction to Beta Logic to reset the arms of the dresser 66. The dresser arms have one of two positions. In reset, the dresser arms are swept across the wheel in one direction, and then sometime later on they will be swept back in the other direction, as will be understood, for wheel dressing. Limit switch, LS 12, will be tripped when the dresser arms have been reset indicating completion of this step, but there has been no dressing yet.

When LS 12 is tripped, the tape will advance to block 5. On block 5 M27 is called up and it provides an instruction from Alpha to the Gamma servo controller to feed the wheel a certain amount, for example, 0.010 inches for dressing. Here again, this function is the same as the function performed at the beginning of the rough dress cycle on the loop tape, with the exception that the wheel is running at this time. As the quill is advanced, a bias is placed on the DCDT coil 174. This provides the signal to the stepping motor control to run the stepping motor 182 and thereby move the coil of the DCDT back to its null position. Here again, this is exactly the same procedure as was involved during the dress for roughing, as discussed above for block 5 of the roughing loop tape.

The coil of the DCDT has now been brought back to its null position and this provides a reset signal to reset M27 so that the tape may be advanced. This reset signal in conjunction with a signal from Alpha, as indicated, will advance the tape to block 6.

On block 6 M60 is called up. That is an instruction to Beta Logic to dress the wheel. On this block of tape, the dresser arms are swept across the grinding wheel and actually dress the wheel, as will be understood. Back on block 4, the arms were reset. Now on block 6, the arms are put back to their position for dressing, and the two tapering surfaces 273, 275, and end surface 271 are dressed.

When the sides and end of the wheel have been dressed, a limit switch LS 12a on the two side dresser arms will be tripped indicating that the stroke across the wheel has been completed. This advances the tape to block 7.

On block 7 there is an instruction from Alpha to Gamma to withdraw the feed quill 1 ½ inches above datum 1, and when that withdrawal is complete, Alpha will advance the tape to block 8.

On block 8, M47 is called up. This is an instruction to the Beta Logic to withdraw the dresser 66, to swing the dresser back out of the way and here again, before this instruction can be executed, LS 19 must first be tripped when the quill is withdrawn the 1 ½ inches. When the dresser is completely swung out of the way it trips limit switch LS 14. That advances the tape to block 9.

On block 9, there are several instructions calling for the following functions. First, an instruction from Alpha to the Gamma controller to advance the quill 1.490 inches. This is to the index position 0.010 inches above the top of the workpiece. The next instruction is the M25 signal to the Beta Logic to unclamp the vertical slide, advance the slide its full amount down until it trips limit switch, LS 3 to apply coolant to the wheel. Also at this time, the slide will be clamped again, tripping LS 20. Another function on the same block 9 is M52 which signals through the Beta Logic to unclamp the work table. Still another function on the same block is M24 which again signals through the Beta Logic and here the index clutch is disengaged and the pressure to the anti-backlash worm piston is released. But before this is executed, there is an interlock through limit switch, LS 21a to make certain that the table is first unclamped, as indicated.

When the index clutch is withdrawn to unlock the index, the index motor 244 will start. Projection 270 will leave contact with LS 7 and upon recontacting LS 7, one revolution thereof later, a signal will be sent back to Beta Logic to stop the motor 244 and at the same time it will provide a signal to reset M24 which initiated the index cycle. This signal, this reset signal, goes through the Alpha control back to Beta Logic and will lock the index and apply pressure to the piston for the antibacklash worm 242. Locking the index will cause limit switch LS 26 to be tripped.

Tripping of LS 26 in conjunction with the tripping of LS 20 (on the same block 9) and further in conjunction with a signal from Alpha that the quill has been advanced 1.490 inches will advance the tape to block 10.

On block 10, M53 is called up and this is a signal to clamp the table, contacting LS 21 which moves the tape to block 11. On block 11 here is an instruction from Alpha to Gamma to advance the quill at a rapid feed rate 0.264 inches into the rough ground slot, stopping 2 or 4 thousandths short of hitting the workpiece. This is done at rapid traverse. Then when the position feed back indicates that the quill has reached the demand position thereof, the tape moves to bring block position 12 to the tape reader. On block 12 there is another instruction from Alpha through the Gamma controller to feed the quill an additional 0.010 inches, with the position feed back operating again to stop the feed movement when the demand position is reached, after which the tape is advanced to block 13.

In connection with discussing the distances that the quill is fed in response to block positions 11 and 12 on the tape, in this exemplary arrangement, it should be noted that we are dealing here with a roughed workpiece wherein each roughed tooth slot has a certain depth, for example, 0.264 inches. Therefore, on block 11, when the quill is advanced 0.264 inches, it is actually only 0.254 inches into the tooth slot because the quill started from its index position of 0.010 inches above the work. And, on block 12 on the tape, the quill moves an additional 0.010 inches so the grinding wheel is now down to a depth of 0.264 inches into the roughed tooth slot.

Block 13 on the tape will withdraw the grinding wheel and quill out of grind and back to index position. Here there is a withdrawal of 0.274 inches. This withdrawal is the same amount that the feed quill was advanced in blocks 11 and 12 combined, and after this withdrawal the tape is advanced to block 14. On block 14 the index cycle is repeated and this will be the same as in block position 9, as will be evident. At the completion of the index, after tripping LS 26 the tape will be advanced to block position 15 which corresponds to block 10 wherein the table 30 will be clamped and the tape will now be advanced to block 16. On block 16 the quill is advanced as was done on block 11, and block 17 again is a duplicate of block 12. Block 18 is also a duplicate of block 13 and what we are doing now is repeating blocks 14 through 18. These blocks consist of an index and feed in for the float grind and then a withdrawal from the grind. In the exemplary arrangement, these steps are repeated a total of one hundred and forty-eight more times, and this will produce one hundred and fifty float ground slots to complete the float grind cycle with a completion of the steps on blocks 19–758.

It might be noted that before float grinding, the wedge carrier 264 for the corrective index preferably is set at the halfway point of its travel and is locked there all during the float grinding process (as is also the case during rough grinding), when there will be only mechanical indexing taking place as effected by the motor 244. Then, at the beginning of a finish grinding cycle, there preferably will be an initial mechanical indexing step, to bring the tooth slot that was first float ground into grinding position and then after that slot has been finished ground, the indexing will be under the control of the Alpha head 266 for precision indexing, as will be apparent. Referring back to the flow chart, after float grinding is completed the tape advances block 759 to the tape reader. Block 759 is again an index, as in block 9 and block 14. This is the first index made on the finish grind cycle and in this particular index there is no precise correction made. This serves as the starting point or zero point. The first slot is about to be finish ground. After indexing and passing through block 760 the work table 30 is clamped and the tape advances to bring block 761 to the reader.

Block 761 is the beginning of the first finish grinding for a tooth slot. On block 761 the quill is advanced at rapid feed rate a total of 0.272 inches in the exemplary arrangement. Here the grinding wheel is stopped 0.002 inches short of touching the bottom of the slot. Then on block 762 there is a controlled feed of 0.004 inches, of which 0.002 inches is actually grind feed. This results in a finish ground depth of 0.266 inches for the tooth slot.

The first tooth slot has now been finish ground (on block 762). After block 762 has been executed, the Alpha controller advances block 763 to the reader. On block 763 there is withdrawal of the quill of 0.276 inches to bring the grinding wheel 0.010 inches above the top of the top of the workpiece. On block 764, there is another index, and this will be the first precision corrective index. The mechanical portion of the index, the first portion of the index, effected through motor 244, is entirely the same as the previous indexes, for example, as in block 14, But at the same time that the mechanical portion of the index is taking place, the stepping motor or corrective index motor 260 is also being operated, through the Alpha controller, and in the reverse direction in order to retract the wedge. This motor 260 will run until the wedge is fully retracted to contact limit switch LS 8. At this time the motor 260 will shut off and on contacting limit switch 8, there will be a signal to the Alpha control which will reset M28 which was the "M" function that started the motor running to retract the wedge.

In connection with this reverse operation of the motor 260, just described, withdrawing the sine bar or wedge, it will be appreciated that what this does, in effect, is to subtract from the mechanical indexing feed of the table (as effected through rotation of worm 240 by motor 244) so that the indexing motion at this time is a combined mechanical indexing motion in the forward direction effected by rotation of worm 240 and a motion in the opposite direction, effected by bodily axial movement of worm 240 caused by the withdrawal of the sine bar or wedge, as is disclosed in more detail in U.S. Pat. No. 3,572,175. This assures that the mechanical indexing operation will end short of the desired distance so that during the precision corrective indexing there will always be some additional motion to be added to achieve precise indexing.

We are now in the process of making our first corrective index. The mechanical portion of the index has been completed, the correction wedge has been withdrawn, the motor 260 has been stopped and we are now ready to advance the wedge and make the precise index correction. In other words, block 764 of the tape has been executed, LS 26 has been tripped and the Alpha controller can now advance block 765 to the tape reader.

On block 765, Alpha will control the corrective index motor 260 to advance or retract the wedge and now there will be some demand position stored in the Alpha console. This is the position that the work table 30 should be in at the completion of one index (it will be some number of lines of the scale grating 268 that the table should have moved). Now, since the wedge was pulled back on block 764 the table was delivered short of this mark. So at this point, the Alpha reading head will read how far the table has been moved, and in doing so, it will sense what the difference is between the actual delivered position and the required demand position, and will commence to make the appropriate correction to bring the table to the demand or our true position for this particular index. At this point, the motor 244 is stopped and it will be suitably held in place, for example, by means of a dynamic brake internal to the motor so at this time the mechanical index drive is locked up. The correction motor 260 will be run in the forward direction at some desired velocity as it is making the correction, in response to the Alpha controller. Motor 260 preferably will maintain some steady velocity and when it gets to within a very short distance of the demand position where it should be stopped, it will start to slow down and by the time it actually gets to the demand position, it will be at zero velocity. This is all accomplished internally to the Alpha system as will be understood. Forward rotation of the motor 260 will advance the wedge to move the worm 240 bodily (to the right, as viewed in FIG. 9) to advance the tale, as will be appreciated.

After the precise index correction has been made, as indicated in the Alpha controller, Alpha will advance block 766 of the tape to the reader. On block 766 M53 and M05 are called up. M53 applies the table clamps and M05 is a signal to the Kappa controller to stop the grinding wheel motor 80. The third instruction called up on block 766 is M00. M00 is a planned stop, as indicated. This is an instruction that the programmer will punch in the tape so that the cycle will stop at this time. This "M" function, M00, could be programmed anywhere in the tape, and whenever it is read by the tape reader, the cycle will be stopped. At this point, the purpose of the stop is to enable setting up of the in-process gauge probe 286, as will be understood. This preferably is done in the middle of the cycle, for example, at this point.

In the exemplary arrangement, to swing or move the gauge bracket into position, the operator will push the cycle start button on the machine, and this advances the tape to the next block, block 767, and here M56 is called up and this causes the gauge bracket to move into position. Thus, by inserting M00 before block 767, the operator is reminded that the in-process gauge has to be set up if it was not set up prior to starting the finish grind cycle. Once the gauge probe 286 has been set up in proper position for the workpiece being ground, block 768 will be advanced to the tape reader.

On block 768, M58 is called up. This is a signal to the Beta Logic to do the following: first, turn on an air supply to supply air to the point of contact between the in-process gauge 286 and the side of the tooth slot (at this point, the gauge probe is not yet touching the side of the tooth and the air blast will clean the surfaces); secondly, the coolant valve is shifted to cut off flow of coolant to the wheel. At the completion of these two steps, the in-process gauge probe is advanced into contact with the side of the tooth (see FIGS. 14, 16), and at this time the air supply is turned off. Here again, also on block 768 of the tape, there is another M00, another planned stop. At this time, in order to restart the automatic cycle, the operator must zero the gauge probe register of the alpha controller. This serves as the starting point and at this time the register is zeroed and the tooth that the probe is on will serve as the starting point or master tooth as indicated by tooth 1 in FIG. 16. Subsequent corrections will be based on this master tooth size, as will be evident.

After the probe register has been zeroed and the digital volt meter 294 is at zero, the cycle start button is pushed to continue the cycle with block 769 on the tape. M03 is called up and this provides a signal to Kappa to restart the grinding wheel motor. At the same time, M59 is called up, and this is a signal to Beta to apply coolant back to the grinding wheel and to retract the probe 286.

At this point, the first tooth in the workpiece has been finish ground, there was an index to the second tooth, and the probe 286 was advanced down into the first tooth slot and at that point, the probe was zeroed. The machine is now ready to finish grind the second tooth and block 770 is advanced to the tape reader. On this block the quill is advanced at rapid feed rate 0.272 inches and on the next block, block 771, there is a further advance of the quill of 0.004 inches at a controlled feed rate (see FIG. 17) and this should make the second tooth slot of the same depth as the firs slot. On block 772, the quill is withdrawn back to index position and then blocks 764 and 765 are repeated, these blocks involving both the mechanical index and the precision corrective index, as described.

On block 773, and 774, therefore, there is indexing to the third slot. The wheel is now directly over the third slot. On block 775, the table is clamped as indicate, and on 776 the machine is ready for insertion of the probe 286 into the second tooth slot (see FIG. 18), with the grinding wheel at the index position. This is done through M58 where again the air is first turned on to clean the surfaces and at the same time the coolant to the wheel is turned off. The probe is advanced into slot 2 and once the probe is in contact with the side of the tooth, as indicated in FIG. 18, the air blast is turned off.

Once the probe is so advanced, a timer, T3, will time out and at that time a reading will be taken with the probe through Alpha. The Alpha controller receives this reading in its gauge probe register. This reading in the exemplary arrangement being considered, compares the thickness of the second tooth to the thickness of the first tooth. The first tooth is the one on which the probe was zeroed, so at this time, if there is a reading other than zero for the second tooth slot, it will indicate that the second tooth is somewhat thicker than the first tooth, for example, due to wheel breakdown or wheel deflections. As indicated, Alpha will receive this reading in its gauge probe register, and having done this, it will advance the tape to block 777.

At this time, there is a signal M59, to the Beta Logic to put the coolant back on the wheel and to retract the probe from the slot. Next the tape advances blocks 778 and 779 to the reader, as indicated, and the feed procedure of blocks 770 and 771 is repeated except that there may be a corrective feed added on block 779, if indicated by the Alpha feed demand register.

On block 778, the quill is advanced 0.272 inches, and on block 779 the quill will be advanced further the 0.004 inches (as on block 771) plus any additional feed ("+ C" on the drawing) needed to correct for any deviation of tooth size that may have been indicated by the previous probe reading of tooth 2. Thus, if there was an error on tooth 2, there will be appropriate compensation for it when tooth 3 is a ground, by feeding the quill and grinding wheel a small additional measured amount down into the slot. This is done in an effort to make tooth 3 the same thickness as tooth 1. At the completion of this function, Alpha advances block 780 to the reader.

It will be noted that on block 779, there was the first corrective finish grinding of a tooth slot using the in-process gauging scheme. This was the third slot finish ground (see FIG 19) but it was the first one subject to the corrective grind. On the next block, block 780, the quill is withdrawn back to index position and the steps of blocks 773 a through 780 are repeated for the next tooth slot, and so on, until all the teeth are finish ground (150 teeth being indicated in the exemplary arrangement). Thus, for example, on blocks 781–788 the mechanical and corrective index cycle is repeated again, and the probe is again advanced in the proper tooth slot (here it will be slot 3, as shown in FIG. 20), for taking a reading of the third finish ground tooth. This reading is again stored in the Alpha feed demand register and at the time the fourth tooth is finish ground there may be some additional correction in the in-feed of the grinding wheel, if indicated by the probe reading. The correction will be cumulative, as will be evident. Thus, if there was some slight correction on tooth 3, and if in grinding tooth 4 (FIG. 20) there is another correction for tooth 4, it will be added to that correction previously made for tooth 3, as will be understood.

Beginning with block 781, therefore, there will be 148 repetitions of steps 773–780 (namely, the index, the corrective index, the probe measurement and the corrective feed), in the exemplary arrangement under consideration, as indicated. At the completion of these steps 148 more times, the end of the tape will be approaching the reader and at this time block 966 will be advanced to the reader. At this point, all of the teeth on the workpiece have been finish ground in one pass, and on block 966 the Alpha and Gamma controllers will effect withdrawal of the feed quill 1 ½ inches above datum 1. Also, at this time, M26 is called up to unclamp the vertical slide, withdraw it the full amount, clamp it in that position and turn off the flow of coolant to the wheel with the bypass valve, as indicated. Also at this time M09 is called up and this will stop the coolant pump motor. M05 is also called up and this signals the Kappa controller to stop the wheel motor 80, and the last instruction on this block is M30 which simply is an instruction for rewinding the tape.

Although in the exemplary arrangement there was some stock removed from the bottom of the tooth slots during finish grinding, it will be understood that, if desired, the slots may be ground to final depth during rough grinding so that only the sides of the tooth slots will be cut during finish grinding.

It will thus be seen that the objects of this invention have been fully and effectively accomplished. It will be realized, however, that the foregoing specific embodiments have been shown and described only for the purpose of illustrating the principles of the invention and are subject to extensive change without departure for such principles. Therefore, this invention includes all modifications encompassed within the spirit and scope of the following claims.

What is claimed is:

1. A machine for cutting teeth in work-pieces including: a rotary work table; a workpiece arranged on said work table; a rotary cutting tool arranged adjacent said work table; means for intermittently indexing said work table through a succession of indexing movements; means providing for periodic infeeding motion between said tool and the workpiece to successively form tooth slots of desired size in the workpiece, and means providing for automatic variation in the infeeding motion on a subsequently cut tooth slot if a previously cut tooth slot was not formed to said desired size.

2. The structure defined in claim 1 wherein said means providing for automatic variation includes a gauging probe arranged adjacent said work table for periodic insertion into the tooth slots.

3. The structure defined in claim 2 and further including means for advancing said probe into a tooth slot after it has been cut and in between indexing movements of said work table.

4. The structure defined in claim 3 wherein said indexing means includes precision means for indexing said table through equal, predetermined angular displacements for each indexing movement thereof.

5. The structure defined in claim 4 wherein said precision means includes means for reading the amount of angular movement of said work table, and means for rotating said work table in accordance with readings taken by said last-mentioned means and means for stopping the rotation of said work table when it has been rotated through a predetermined angular displacement.

6. Structure for finishing a workpiece having roughed out tooth slots therein including: a rotary work table; a workpiece arranged on aid table; a rotary grinding wheel arranged adjacent said work table; means or intermittently indexing said work table through a succession of indexing movements; means providing a relative infeeding motion between workpiece and grinding wheel so that the grinding wheel enters into said slots a predetermined distance for the finish cutting operation; means for taking a measurement of the size of a previously finished tooth slot and providing for varying the predetermined distance of relative infeed between workpiece and grinding wheel for a subsequent tooth slot to be finished if the previously finished tooth slot is not of a pre-established size.

7. The structure defined in claim 6 wherein said means providing for automatic variation includes a gauging probe arranged adjacent said work table for periodic insertion into the tooth slots.

8. The structure defined in claim 7 and further including means for advancing said probe into a tooth slot after it has been cut and in between indexing movements of said work table.

9. The structure defined in claim 8 wherein said indexing means includes precision means for indexing said table through equal, predetermined angular displacements for each indexing movement thereof.

10. The structure define in claim 9 wherein said precision means includes means for reading the amount of angular movement of said work table, and means for rotating said work table in accordance with readings taken by said last-mentioned means, and means for stopping the rotation of said work table when it has been rotated through a predetermined angular displacement.

11. A machine for forming teeth in workpieces comprising
- a rotary work table adapted to receive a workpiece thereon,
- a rotary spindle for holding a forming tool, workpiece
- first means operatively engaged to said spindle for rotating the spindle,
- second means operatively engaged to said spindle for effecting axial movement of the spindle, said second means including a feed quill operatively engaged to said spindle, a motor, and means drivingly connecting said motor to said feed quill to effect axial movement of the feed quill when the motor is operated,
- third means releasably interconnected with said spindle for imparting oscillating axial motions to said spindle when said first means is operating to rotate said spindle, said third means including a cam means releasably connected to said first means for being driven thereby, an electrical coil means, means for slidably mounting said coil means relative to said quill, a core operatively associated with said cam means and wit said coil means to follow rotation of said cam means to be thereby reciprocated in said coil, and an electrical control system operatively connected to said coil and said motor to vary operation of the motor in response to reciprocations of said core.

12. The structure defined in claim 11 wherein said third means includes means for varying operation of said motor in accordance with rotary movements of said spindle.

13. The structure defined in claim 11 wherein said third means includes a releasable clutch arrangement for selective interconnection between said first and said second means.

* * * * *